United States Patent
Wu et al.

(10) Patent No.: US 12,113,439 B2
(45) Date of Patent: Oct. 8, 2024

(54) ADJUSTABLE VOLTAGE REGULATOR CIRCUITRY

(71) Applicant: National Taiwan University, Taipei (TW)

(72) Inventors: Bing-Chen Wu, Taipei (TW); Tsung-Te Liu, Taipei (TW)

(73) Assignee: National Taiwan University, Taipei (TW)

( * ) Notice: Subject to any disclaimer, the term of this patent is extended or adjusted under 35 U.S.C. 154(b) by 241 days.

(21) Appl. No.: 17/838,289

(22) Filed: Jun. 13, 2022

(65) Prior Publication Data
US 2023/0402921 A1   Dec. 14, 2023

(51) Int. Cl.
*H02M 3/07* (2006.01)
*G05F 1/46* (2006.01)
*H02M 1/00* (2007.01)

(52) U.S. Cl.
CPC .............. *H02M 3/07* (2013.01); *G05F 1/465* (2013.01); *H02M 1/0012* (2021.05)

(58) Field of Classification Search
CPC .......... H02M 1/0012; H02M 3/07–078; G05F 1/465; G05F 1/618; G11C 5/14; G11C 5/143–148
See application file for complete search history.

(56) References Cited

U.S. PATENT DOCUMENTS

| | | | |
|---|---|---|---|
| 6,995,995 B2 | 2/2006 | Zeng et al. | |
| 7,907,429 B2 | 3/2011 | Ramadass et al. | |
| 9,658,666 B1* | 5/2017 | Ghayal | H02M 1/0043 |
| 10,439,492 B1* | 10/2019 | Hsieh | H02M 3/07 |
| 2007/0103994 A1* | 5/2007 | Ahmed | G11C 5/145 |
| | | | 365/189.11 |
| 2018/0019667 A1* | 1/2018 | Salem | H02M 3/07 |

OTHER PUBLICATIONS

Do Amaral et al, "Digital-LDO Switched Capacitors based for 0.5V applications," 2020 32nd International Conference on Microelectronics, Aqaba, Jordan, Dec. 14-17, 2020, doi: 10.1109/ICM50269.2020.9331773. Obtained on Mar. 27, 2024. ( Year: 2020).*

(Continued)

*Primary Examiner* — Fred E Finch, III
(74) *Attorney, Agent, or Firm* — JCIPRNET

(57) ABSTRACT

An adjustable voltage regulator circuit, including a voltage conversion circuit, a voltage conversion controller, and a clock generator, is provided. The voltage conversion circuit receives an input voltage to generate an output voltage. The voltage conversion controller detects the output voltage, compares the output voltage with a reference voltage value, and outputs an enable signal based on a comparison result to control the voltage conversion circuit to adjust the output voltage. The clock generator generates a first clock signal and a second clock signal to respectively drive the voltage conversion circuit and the voltage conversion controller. The voltage conversion controller adjusts the enable signal to gradually adjust the output voltage to a predetermined voltage range.

15 Claims, 13 Drawing Sheets

(56) References Cited

OTHER PUBLICATIONS

Liao et al., "Reconfigurable Switched-Capacitor DC-DC Converter with Adaptive Switch Modulation and Frequency Scaling Techniques," 2021 IEEE International Symposium on Circuits and Systems, Daegu, Korea, published Apr. 27, 2021, doi: 10.1109/ISCAS51556.2021.9401096. Obtained on Mar. 27, 2024. (Year: 2021).*

Yu-Tso Lin et al., "A 180 mV 81.2%-Efficient Switched-Capacitor Voltage Doubler for IoT Using Self-Biasing Deep N-Well in 16-nm CMOS FinFET", IEEE Solid-State Circuits Letters, vol. 1, No. 7, Jul. 2018, pp. 158-161.

Bing-Chen Wu et al., "A Fully Integrated Switched-Capacitor Voltage Regulator with Multi-Rate Successive Approximation Achieving 190 ps Transient FoM and 83.7% Conversion Efficiency", IEEE 2021 Symposium on VLSI Circuits, Jun. 13-19, 2021, Grace Period Disclosure, pp. 1-2.

* cited by examiner

ADJUSTABLE VOLTAGE REGULATOR CIRCUITRY

BACKGROUND

Technical Field

The disclosure relates to an adjustable voltage regulator circuit, and in particular to an adjustable voltage regulator circuit that can adjust a search rate of a target voltage.

Description of Related Art

For operation under a near-threshold voltage (NTV), it is a common solution currently to use a fully integrated switched-capacitor voltage regulator (SCVR) to generate on-chip power. As such, the SCVR needs to generate workloads that can support different dynamic changes in different operation modes, so as to output working currents with different magnitudes.

However, integrated circuit chips have workloads with different dynamic changes in different operation modes to output working currents with different magnitudes. A load change caused by switching between different operation modes is usually accompanied by a transient response of the load, and a voltage change caused during the switching process of different modes may lead to malfunction. Therefore, the changing voltage must be corrected back to a target voltage range by voltage conversion. The time of a slower transient response of the load affects the efficiency of the voltage conversion, thus making it difficult to improve the required time cost of the voltage conversion. Therefore, how to generate a fast transient response of the load causes the design of the SCVR to face many challenges.

It should be noted that the content of the "Description of Related Art" paragraph is used to help understand the disclosure. Some of the content (or all of the content) disclosed in the "Description of Related Art" paragraph may not be known by persons skilled in the art. The content disclosed in the "Description of Related Art" paragraph does not mean that the content has been known to persons skilled in the art before the application of the disclosure.

SUMMARY

The disclosure provides an adjustable voltage regulator circuit to adjust a restoration time of voltage regulation.

The disclosure provides an adjustable voltage regulator circuit, which includes a voltage conversion circuit, a voltage conversion controller, and a clock generator. The voltage conversion circuit receives an input voltage to generate an output voltage in a first clock cycle. The voltage conversion controller detects the output voltage, compares the output voltage with a reference voltage value, and outputs an enable signal based on a comparison result to control the voltage conversion circuit to adjust the output voltage. The clock generator generates a first clock signal and a second clock signal to respectively drive the voltage conversion circuit and the voltage conversion controller. The voltage conversion controller adjusts the enable signal to gradually restore the output voltage to a predetermined voltage range.

The adjustable voltage regulator circuit of the disclosure flexibly and gradually adjusts a DCM code according to actual requirements of a target voltage based on an MRSA algorithm to speed up the search speed of searching for the DCM code corresponding to the voltage and improve the load regulation. An equivalent output impedance value may be dynamically adjusted according to the circuit configuration of a voltage conversion unit, and when designing the physical layout of a flying capacitor, the overlapping of a metal layer and a transistor gate generates additional inductive capacitor, which may increase the capacitance density in an element. In addition, the voltage conversion controller may adaptively adjust the frequency based on a feedback value of the output voltage to adjust the switching frequency of the voltage conversion unit, which is beneficial to improving the load regulation under high load and improve the overall voltage conversion efficiency.

In order for the features and advantages of the disclosure to be more comprehensible, an adjustable voltage regulator circuit provided by the disclosure is hereinafter described in detail with the drawings.

DESCRIPTION OF THE EMBODIMENTS

Figure 1:
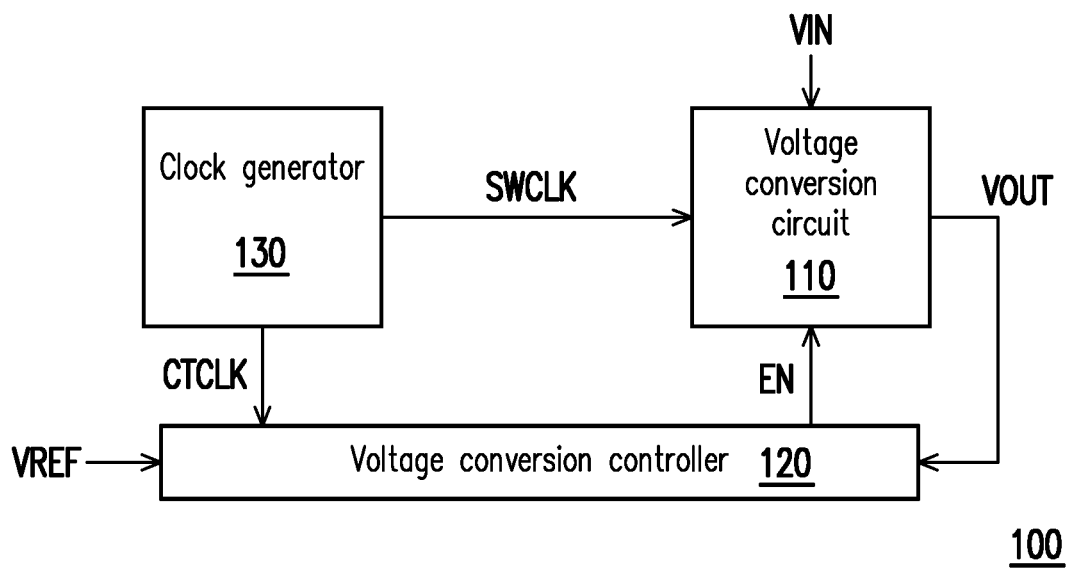
FIG. 1 is a schematic diagram of a circuit block of an adjustable voltage regulator circuit according to an embodiment of the disclosure.

The feature of the inventive concept and the method for achieving the feature may be more readily understood by reference to the following detailed description of the embodiments and the drawings. Hereinafter, embodiments will be described in more detail with reference to the drawings. In the drawings, the same reference numerals refer to the same elements throughout. However, the disclosure may be embodied in various different forms and should not be construed as limited to the embodiments set forth herein only. Rather, the embodiments are provided as examples for the disclosure to be thorough and complete, and to fully convey the various aspects and features of the invention to persons skilled in the art. Therefore, processes, elements, and techniques that are not necessary for persons skilled in the art to have a complete understanding of the aspects and features of the invention may not be described. Unless otherwise indicated, the same reference numerals refer to the same elements throughout the drawings and the written description, so the descriptions thereof will not be repeated. In the drawings, the relative sizes of elements, layers, and regions may be exaggerated for clarity.

In the following description, for purposes of explanation, numerous specific details are set forth in order to provide a thorough understanding of various embodiments. However, it will be apparent that the various embodiments may be practiced without the specific details or without one or more equivalent arrangements. In other instances, well-known structures and devices are shown in the form of block diagrams in order to prevent unnecessarily obscuring the various embodiments.

The terminology used herein is only for the purpose of describing specific embodiments and is not intended to limit the invention. As used herein, unless the context clearly dictates otherwise, the singular form "a/an" is intended to include the plural form as well. It will be further understood that the terms "comprises/comprising", "have/having", and "includes/including" indicate the presence of the stated feature, entirety, step, operation, and/or element, but does not exclude the presence or addition of one or more other features, entireties, steps, operations, elements, and/or groups thereof when used in the specification. As used herein, the term "and/or" includes any and all combinations of one or more of the associated listed items.

As used herein, the terms "substantially", "about", "approximately", and similar terms are used as terms of approximation and not as terms of degree, and are intended to account for inherent bias in measurements or calculations that would be recognized by persons skilled in the art. Taking into account the measurement in question and the errors (that is, limitations of a measurement system) associated with the measurement of a specific quantity, as used herein, "about" or "approximately" includes the stated value and is intended to be within an acceptable range of deviation from the specific value as determined by persons skilled in the art. For example, "about" may mean within one or more standard deviations or within ±30%, 20%, 10%, or 5% of the stated value. Furthermore, when describing the embodiments of the invention, the use of "may" means "one or more embodiments of the invention".

When a certain embodiment may be implemented in different ways, the specific processing order may be executed differently from the described order. For example, two processes described in succession may be executed substantially concurrently or in the reverse order from the described order.

Various embodiments are described herein with reference to cross-sectional views that are schematic illustrations of embodiments and/or intermediate structures. Therefore, variations from the shapes shown are to be expected as a result of, for example, manufacturing techniques and/or tolerances. Furthermore, for the purpose of describing embodiments according to the concepts of the disclosure, specific structural or functional descriptions disclosed herein are merely illustrative. Therefore, the embodiments disclosed herein should not be construed as being limited to the specific shapes of regions shown, but should include (for example) shape deviations caused by manufacturing.

Electronics or electronic devices and/or any other related devices or elements described herein according to the embodiments of the invention may be implemented using any suitable hardware, firmware (for example, application specific integrated circuits), software, or a combination of software, firmware, and hardware. For example, various elements of the devices may be formed on an integrated circuit (IC) chip or on an independent IC chip. In addition, various elements of the devices may be implemented on a flexible printed circuit film, a tape carrier package (TCP), and a printed circuit board (PCB), or formed on a substrate. Furthermore, various elements of the devices may be processes or threads running on one or more processors in one or more computing devices, executing computer program instructions, and interacting with other system elements for executing various functions described herein. The computer program instructions are stored in a memory that may be implemented in a computing device using a standard memory device, such as a random access memory (RAM). The computer program instructions may also be stored in other non-transitory computer-readable media, such as CD-ROMs, flash memory drivers, or the like. Furthermore, persons skilled in the art will recognize that the functions of various computing devices may be combined or integrated into a single computing device, or that the functions of a specific computing device may be distributed over one or more other computing devices without departing from the spirit and scope of the exemplary embodiments of the disclosure.

Unless otherwise defined, all terms (including technical and scientific terms) used herein have the same meaning as commonly understood by persons skilled in the art to which the invention belongs. It will be further understood that terms (such as the terms defined in commonly used dictionaries) should be construed to have meanings consistent with the meanings in the context of the related art and/or the specification, and should not be interpreted in an idealized or overly formalized sense, unless explicitly defined as such herein.

Since an integrated circuit chip has workloads with different dynamic changes in different operation modes, working currents with different magnitudes, such as an operation in a sleep mode (μA) and an operation in an active mode (mA), are output. However, a load change caused by switching between different operation modes is usually accompanied by a transient response of the load. Therefore, how to generate a fast transient response of the load to alleviate malfunction caused by the voltage change caused by the switching of the load between the sleep and active modes, and how to enable an SCVR to have high conversion efficiency (n) and high current density while supporting a relatively wide load range cause the design of the SCVR to face challenges.

In order to overcome the challenges while minimizing the transient response of the load, the conversion loss of the load, and the cost per unit area, proper selection of the correct voltage conversion modulation scheme is very important because the modulation scheme determines the transient response of the load, the conversion loss, the cost per unit area, and various constraints of design complexity. Among many modulation schemes, digital capacitance modulation (DCM) is an effective method for regulating an output voltage of the SCVR while minimizing voltage conversion loss in a relatively wide load range.

Through using the DCM, a switched-capacitor (SC) network region in the SCVR may be divided into multiple segments, and the number of activated segments is controlled by a DCM control code to form a corresponding output impedance and voltage drop, so as to convert to the required output voltage. In this way, the modulation of the SCVR based on the DCM may be implemented by dynamically searching for the most suitable DCM control code according to a target voltage and the sensed load. Since the conversion loss is a function of an equivalent capacitance value and an equivalent switch impedance (or resistance) value, the DCM may effectively modulate the conversion loss and output the target voltage simultaneously in one control loop.

Besides, using the DCM can reduce the dependency between the switching frequency of the switched-capacitor and the transient response of the load in the SCVR. Therefore, the transient response of the load can be improved without increasing or fixing the switching frequency. In addition, the DCM also has additional size and voltage conversion control flexibility to further improve the transient response of the load at a fixed switching frequency through reducing the search time complexity of the DCM control code. In this way, the fast transient response of the load can still be implemented at a relatively slow switching frequency to minimize losses related to the switching frequency. On the other hand, compared with using pulse frequency modulation (PFM) or pulse skipping modulation (PSM), the disclosure also has a faster transient response of the load.

Current methods for determining the DCM control code generally rely on linear search. The linear search causes the voltage restoration time and the settling time of the transient state of the load to be limited by a relatively large search time complexity of a n-bit DCM controller. In order to reduce the search time complexity of the n-bit DCM controller, the disclosure proposes a multi-rate successive approximation (MRSA) (also referred to as gradual adjustment) algorithm.

The MRSA algorithm may continuously track or search the number of turned-on SC segments through a shift and increment process without resetting back to an initial state. The MRSA algorithm may implement O(n) time complexity when searching for an n-bit DCM control code. In addition, since only a relatively simple shift and add operation is adopted, using the MRSA algorithm on the SCVR to implement a voltage conversion control circuit does not incur significant cost.

According to another embodiment of the disclosure, the circuit architecture of the disclosure includes, but is not limited to, using a successive approximation register (SAR) algorithm to determine the DCM control code, so as to implement the technical effect of gradual adjustment.

Please refer to FIG. 1. FIG. 1 is a schematic diagram of a circuit block of an adjustable voltage regulator circuit according to an embodiment of the disclosure. An adjustable voltage regulator circuit 100 shown in FIG. 1 at least includes a voltage conversion circuit 110, a voltage conversion controller 120, and a clock generator 130.

Please refer to FIG. 1. In the embodiment, the voltage conversion circuit 110 receives an input voltage VIN, and receives a clock signal SWCLK generated by the clock generator 130 in a first clock cycle to generate an output voltage VOUT. The voltage conversion controller 120 may detect the output voltage VOUT, and compare the output voltage VOUT with at least one reference voltage value VREF. In another embodiment, the reference voltage value may have multiple predetermined values. The voltage conversion controller 120 may output an enable signal EN to the voltage conversion circuit 110 based on a comparison result to control the voltage conversion circuit 110 to adjust the original output voltage VOUT. The clock generator 130 may be configured to generate at least one first clock signal SWCLK to drive the voltage conversion circuit 110, and at least one second clock signal CTCLK to drive the voltage conversion controller 120, wherein the voltage conversion controller may adjust the enable signal EN to gradually restore the output voltage VOUT to a predetermined voltage range. The voltage conversion controller 120 gradually adjusts a feedback output voltage VOUT based on the feedback output voltage VOUT generated by the voltage conversion circuit 110 in a second clock cycle to restore the feedback output voltage VOUT to a predetermined voltage level range.

According to another embodiment of the disclosure, the adjustable voltage regulator circuit 100 includes multiple voltage conversion circuits 110 (not shown) connected in parallel.

Figure 2A:
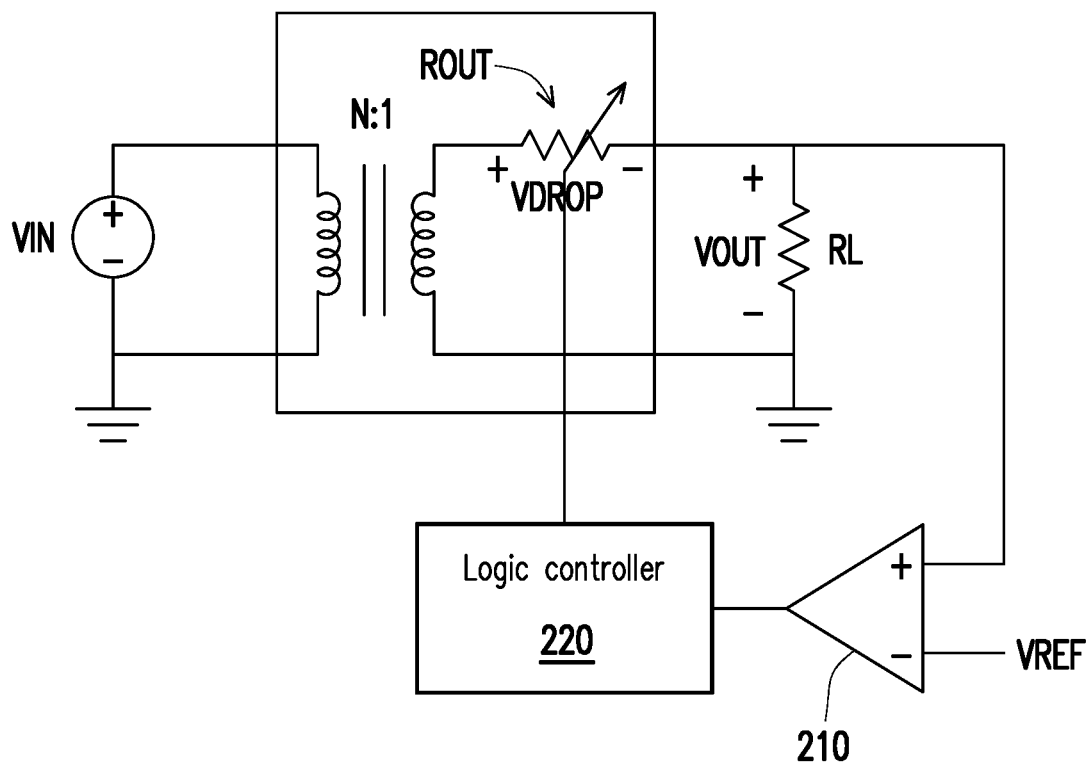
FIG. 2A is a schematic diagram of a circuit model of a voltage conversion circuit of FIG. 1 according to the disclosure.

Please refer to FIG. 2A and FIG. 1 at the same time. FIG. 2A is a schematic diagram of a circuit model of a voltage conversion circuit shown in FIG. 1 according to the disclosure. The schematic diagram of the circuit model of the voltage conversion circuit includes an input voltage source, an ideal DC-DC converter with an N:1 conversion rate, where N is a positive integer, a comparator 210, and a logic controller 220.

Please refer to FIG. 2A. In the embodiment, the input voltage source may provide the input voltage VIN, and the voltage conversion circuit is connected in series with a variable equivalent output impedance ROUT. The resistance value of the variable equivalent output impedance ROUT is controlled by the logic controller 220, and a voltage difference VDROP is generated on the variable equivalent output impedance ROUT. Finally, the output voltage VOUT may be generated on a load RL. After comparing the output voltage VOUT with the reference voltage VREF at a negative terminal of the comparator 210, a comparison result is output. The logic controller 220 may receive the comparison result, execute the MRSA algorithm based on the feedback result to dynamically adjust the resistance value of the equivalent output impedance ROUT, and output the adjusted output voltage VOUT in the next cycle.

According to another embodiment of the disclosure, the reference voltage VREF may be preset according to requirements and is not limited to one reference voltage value.

Please refer to FIG. 2A and FIG. 1. According to another embodiment of the disclosure, the voltage conversion controller 120 controls the voltage conversion circuit 110 to generate a corresponding output impedance value (for example, the variable equivalent output impedance ROUT). In addition, the voltage conversion controller 120 adjusts the output voltage VOUT based on the corresponding output impedance value to restore the output voltage VOUT to an acceptable voltage range.

Please refer to FIG. 2A. The logic controller 220, the variable equivalent output impedance ROUT, and the comparator 210 form a series feedback loop.

Figure 2B:
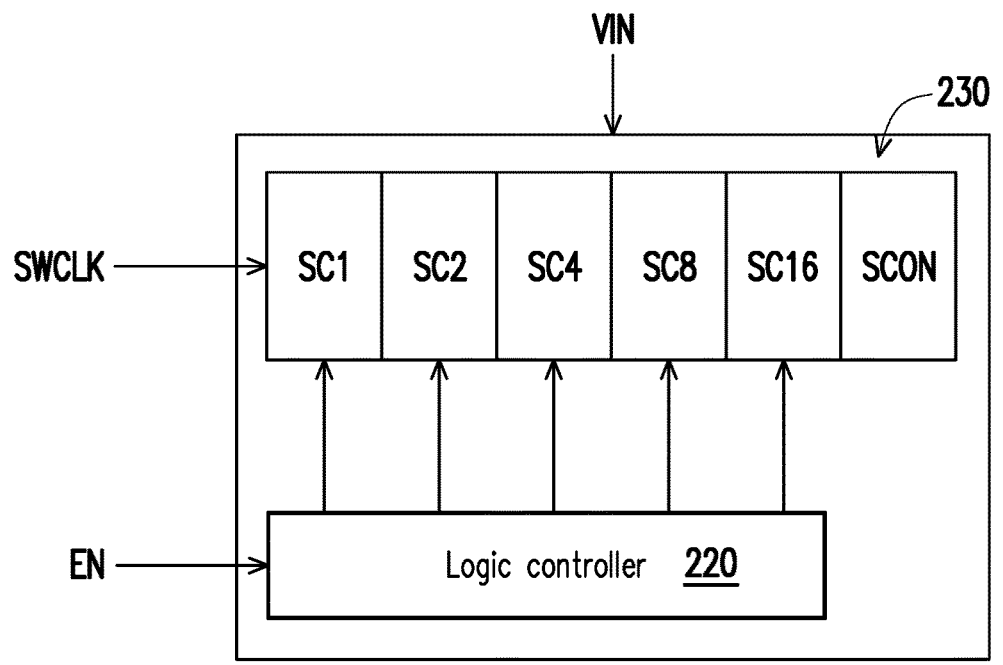
FIG. 2B is a schematic diagram of a circuit block of a voltage conversion circuit according to an embodiment of the disclosure.

Please refer to FIG. 2B. FIG. 2B is a schematic diagram of a circuit block of a voltage conversion circuit according to an embodiment of the disclosure. A voltage conversion circuit 200 includes multiple controlled voltage conversion units 230, a voltage conversion unit SCON with a constant operation state, and the logic controller 220.

Please refer to FIG. 2B. In the embodiment, at least one of the voltage conversion units 230 may receive the input voltage VIN and the first clock signal SWCLK to execute voltage conversion, and each voltage conversion unit has a corresponding different switching capacitance weight. For example, a voltage conversion unit SC1 may have one unit weight of equivalent capacitor number and/or equivalent capacitance value, a voltage conversion unit SC2 may have two unit weights of equivalent capacitor number and/or equivalent capacitance value, a voltage conversion unit SC4 may have four unit weights of equivalent capacitor number and/or equivalent capacitance value, and so on. According to the embodiment of the disclosure, the number of voltage conversion units is 6, wherein voltage conversion units SC1, SC2, SC4, SC8, and SC16 are controlled by the logic controller 220. The voltage conversion unit SCON is constantly in a turned-on state and is not controlled by the logic controller 220.

Please refer to FIG. 2B. In the embodiment, the logic controller 220 receives the corresponding enable signal EN generated by the voltage conversion controller based on a feedback voltage. The logic controller 220 generates a corresponding digital control code according to the enable signal EN, and determines whether the voltage conversion units SC1, SC2, SC4, SC8, and SC16 are turned on based on the digital control code. For example, when the binary control code is 00001 (that is, the decimal number 1), only the position of the least significant bit (LSB) is the number 1 at this time, so the voltage conversion unit SC1 is turned on. When the binary control code is 10000 (that is, the decimal number 16), only the position of the most significant bit (MSB) is the number 1 at this time, so the voltage conversion unit SC16 is turned on. When the binary control code is 01010 (that is, the decimal number 10), the voltage conversion unit SC2 and the voltage conversion unit SC8 are simultaneously turned on at this time.

In the embodiment, the binary control code has at least the same number of bits as the total number of voltage conversion units. For example, in the embodiment, there are five voltage conversion units (excluding the voltage conversion unit SCON with the constant turned-on state), so the binary control code has at least five bits.

According to another embodiment of the disclosure, the digital control code may be a digital capacitance modulation (DCM) code, and the disclosure does not limit the encoding manner thereof.

According to another embodiment of the disclosure, the DCM code has at least two bits to represent at least the operations of bit shift left, bit shift right, and bit increment.

According to another embodiment of the disclosure, the number of the voltage conversion units 230 is not limited, and the required number of voltage conversion units may be divided from the enable signal EN output by the voltage conversion controller. In other words, the enable signal EN may determine the number of the voltage conversion units 230. The voltage conversion controller searches for the corresponding enable signal EN according to the feedback output voltage of the voltage conversion circuit. For example, in the embodiment, when the enable signal EN is EN(4:0), the voltage conversion unit 230 may be divided into five controlled voltage conversion units SC1, SC2, SC4, SC8, and SC16 and one voltage conversion unit SCON with the constant turned-on state.

Figure 2C:
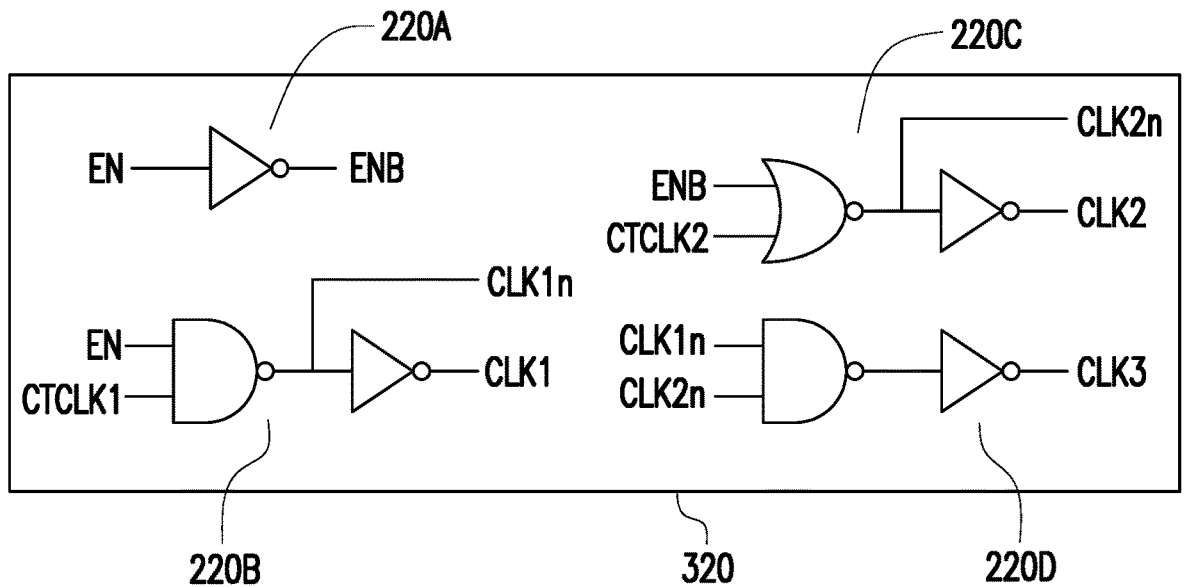
FIG. 2C is a schematic circuit diagram of a logic controller according to an embodiment of the disclosure.

Please refer to FIG. 2C. FIG. 2C is a schematic circuit diagram of a logic controller according to an embodiment of the disclosure. In the embodiment, the logic controller 220 includes four logic sub-circuits 220A, 220B, 220C, and 220D.

Please refer to FIG. 2C. In the embodiment, the logic sub-circuit 220A is a NOT gate, an input terminal thereof receives the enable signal EN, and an output terminal outputs an inverse enable signal ENB. The logic sub-circuit 220B is composed of a NAND gate and a NOT gate, wherein one of the input terminals of the NAND receives the enable signal EN, and the other terminal receives a first control clock signal CTCLK1. After a logic operation, an inverse first gating clock signal CLK1n is output, the inverse first gating clock signal CLK1n is used as the input of the NOT gate, and a first gating clock signal CLK1 is output at an output terminal. The logic sub-circuit 220C is composed of a NOR gate and a NOT gate, wherein one of the input terminals of the NOR gate receives the inverse enable signal ENB, and the other terminal receives a second control clock signal CTCLK2. After a logic operation, an inverse second gating clock signal CLK2n is output, the inverse second gating clock signal CLK2n is used as the input of the NOT gate, and a second gating clock signal CLK2 is output at an output terminal. The logic sub-circuit 220D is composed of a NAND gate and a NOT gate, wherein one of the input terminals of the NAND gate receives the inverse first gating clock signal CLK1n, and the other terminal receives the inverse second gating clock signal CLK2n. After a NOT gate logic operation, the output of the NAND gate outputs a third gating clock signal CLK3 at an output terminal.

According to another embodiment of the disclosure, the forms of the logic sub-circuits 220A, 220B, 220C, and 220D are not limited to the above-mentioned combinational logic circuits. All circuits that can achieve the same logic functions are included within the scope of the embodiments of the disclosure.

Figure 3A:
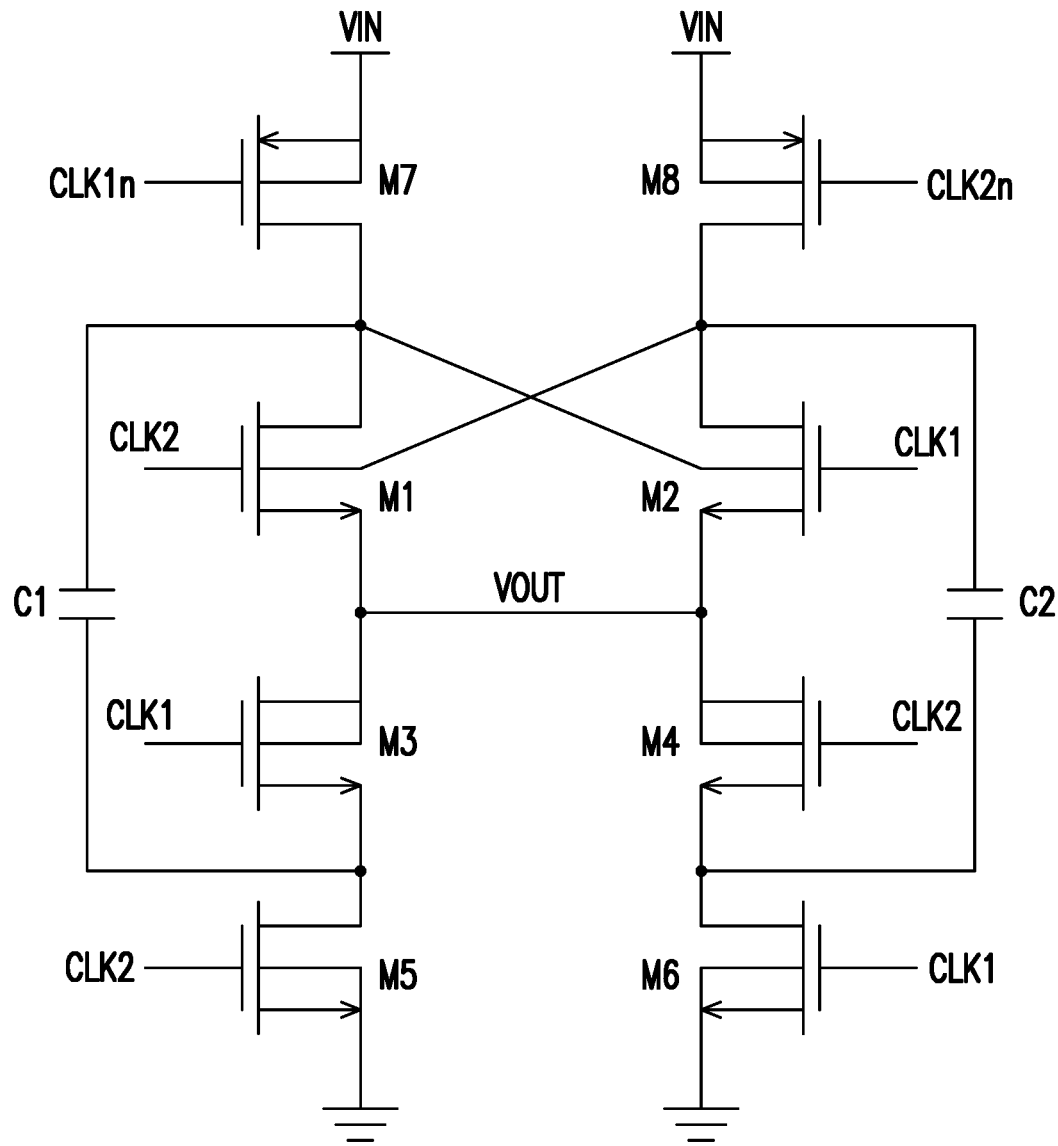
FIG. 3A is a schematic circuit diagram of a voltage conversion unit according to an embodiment of the disclosure.

Please refer to FIG. 2B and FIG. 3A at the same time. FIG. 3A is a schematic circuit diagram of a voltage conversion unit according to an embodiment of the disclosure. According to an embodiment of the disclosure, each voltage conversion unit 230 is a symmetric bias circuit composed of multiple power metal-oxide-silicon (MOS) transistor switch. Each symmetric bias circuit in the voltage conversion units 230 receives the same input voltage VIN, and an output terminal VOUT of each symmetric bias circuit is connected to each other. For example, input terminals of the controlled voltage conversion units SC1, SC2, SC4, SC8, and SC16 and the voltage conversion unit SCON with the constant turned-on state are connected in parallel, and output terminals are connected in parallel.

Please refer to FIG. 2B and FIG. 3A at the same time. According to an embodiment of the disclosure, the symmetric bias circuit includes a first transistor M1, a second transistor M2, a third transistor M3, a fourth transistor M4, a fifth transistor M5, a sixth transistor M6, a seventh transistor M7, an eighth transistor M8, a first capacitor C1, and a second capacitor C2.

In the embodiment, the first transistor M1 receives the input voltage VIN at a drain terminal through the seventh transistor M7, and may receive the second gating clock signal CLK2 generated by the clock generator from a gate terminal. The second transistor M2 receives the input voltage VIN at a drain terminal through the eighth transistor M8, and may receive the first gating clock signal CLK1 generated by the clock generator from a gate terminal. The drain terminal (that is, a second drain terminal) of the second transistor M2 is connected to a base terminal (that is, a first base terminal) of the first transistor M1, and a base terminal (that is, a second base terminal) of the second transistor M2 is connected to the drain terminal (that is, a first drain terminal) of the first transistor M1. The base terminal of the first transistor M1 and the base terminal of the second transistor M2 may both receive the input voltage VIN as a bias voltage of the transistor. In other words, the first transistor M1 and the second transistor M2 must have the base terminals for base terminal biasing.

In the embodiment, the third transistor M3 receives the first gating clock signal CLK1 at a gate terminal. A base terminal (that is, a third base terminal) and a drain terminal (that is, a third drain terminal) of the third transistor M3 are connected to each other. The fourth transistor M4 receives the second gating clock signal CLK2 at a gate terminal. A base terminal (that is, a fourth base terminal) and a drain terminal (that is, a fourth drain terminal) of the fourth transistor M4 are connected to each other. In addition, the drain terminal of the fourth transistor M4 and the drain terminal of the third transistor M3 are connected to each other, wherein the drain terminal of the fourth transistor M4 and the drain terminal of the third transistor M3 are output terminals of the symmetric circuit, and the output voltage VOUT is output at the output terminals.

In the embodiment, the fifth transistor M5 receives the second gating clock signal CLK2. The sixth transistor M6 receives the first gating clock signal CLK1. A base terminal and a source terminal of the fifth transistor M5 are connected to each other and are both grounded. A base terminal and a source terminal of the sixth transistor M6 are connected to each other and are both grounded (that is, the lowest voltage of the entire circuit).

In the embodiment, a source terminal and a base terminal of the seventh transistor M7 are connected to each other, the input voltage VIN is received at the source terminal, and the inverse first gating clock signal CLK1n may be received at a gate terminal. Similarly, a source terminal and a base terminal of the eighth transistor M8 are connected to each other, the input voltage VIN is received at the source terminal, and the inverse second gating clock signal CLK2n may be received at a gate terminal.

In the embodiment, one terminal of the first capacitor C1 is connected to the source terminal of the first transistor M1 and the base terminal of the second transistor M2, and the other terminal is connected to the drain terminal (that is, the third drain terminal) of the third transistor M3. One terminal of the second capacitor C2 is connected to the source terminal of the second transistor M2 and the base terminal of the first transistor M1, and the other terminal is connected to the drain terminal (that is, the fourth drain terminal) of the fourth transistor M4.

In the embodiment, when the symmetric bias circuit is during a first time interval, the first transistor M1, the fourth transistor M4, the fifth transistor M5, and the eighth transistor M8 are all turned off. A voltage difference between the base terminal and the source terminal of the first transistor M1 is zero. At this time, the voltage at the gate terminal of the first transistor M1 is zero, the voltage at the base terminal is half of the input voltage (½ Vin), and the voltage at the source terminal is also ½ Vin. A voltage difference between the base terminal and the source terminal of the second transistor M2 is ½ Vin. At this time, the voltage at the gate terminal and the base terminal of the second transistor M2 is the input voltage (Vin), and the voltage at the source terminal is ½ Vin. Therefore, in an operation mode during the first time interval, the second transistor M2 has an additional forward bias, which can equivalently reduce the on-resistance of the second transistor M2, so that the switching speed can be improved, and the power loss when the channel is turned on can be effectively reduced. At this time, the second transistor M2, the seventh transistor M7, the capacitor C1, the third transistor M3, the sixth transistor M6, and the output terminal form a conductive loop.

Similarly, when the symmetric bias circuit is during a second time interval, the second transistor M2, the third transistor M3, the sixth transistor M6, and the seventh transistor M7 are all turned off. At this time, the voltage at the gate terminal of the second transistor M2 is zero, the voltage at the base terminal is half of the input voltage (½ Vin), and the voltage at the source terminal is also ½ Vin. A voltage difference between the base terminal and the source terminal of the first transistor M1 is ½ Vin. At this time, the voltage at the gate terminal and the base terminal of the first transistor M1 is the input voltage (Vin), and the voltage at the source terminal is ½ Vin. Therefore, in an operation mode during the second time interval, the first transistor M1 has an additional forward bias, which can equivalently reduce the on-resistance of the first transistor M1, so that the switching speed can be improved, and the power loss when the channel is turned on can be reduced. At this time, the first transistor M1, the eighth transistor M8, the capacitor C2, the fourth transistor M4, the fifth transistor M5, and the output terminal form a conductive loop.

According to an embodiment of the disclosure, in a complete operation cycle, the first time interval and the second time interval may be successively and alternately switched. The on-resistance of the first transistor M1 and the on-resistance of the second transistor M2 may also be dynamically adjusted during different time intervals to achieve the technical effect of adaptive resistance biasing.

According to another embodiment of the disclosure, some or all of the first transistor M1, the second transistor M2, the third transistor M3, the fourth transistor M4, the fifth transistor M5, the sixth transistor M6, the seventh transistor M7, and the eighth transistor M8 may choose to use high voltage threshold (HVT) elements to reduce leakage current and static power consumption.

Figure 3B:
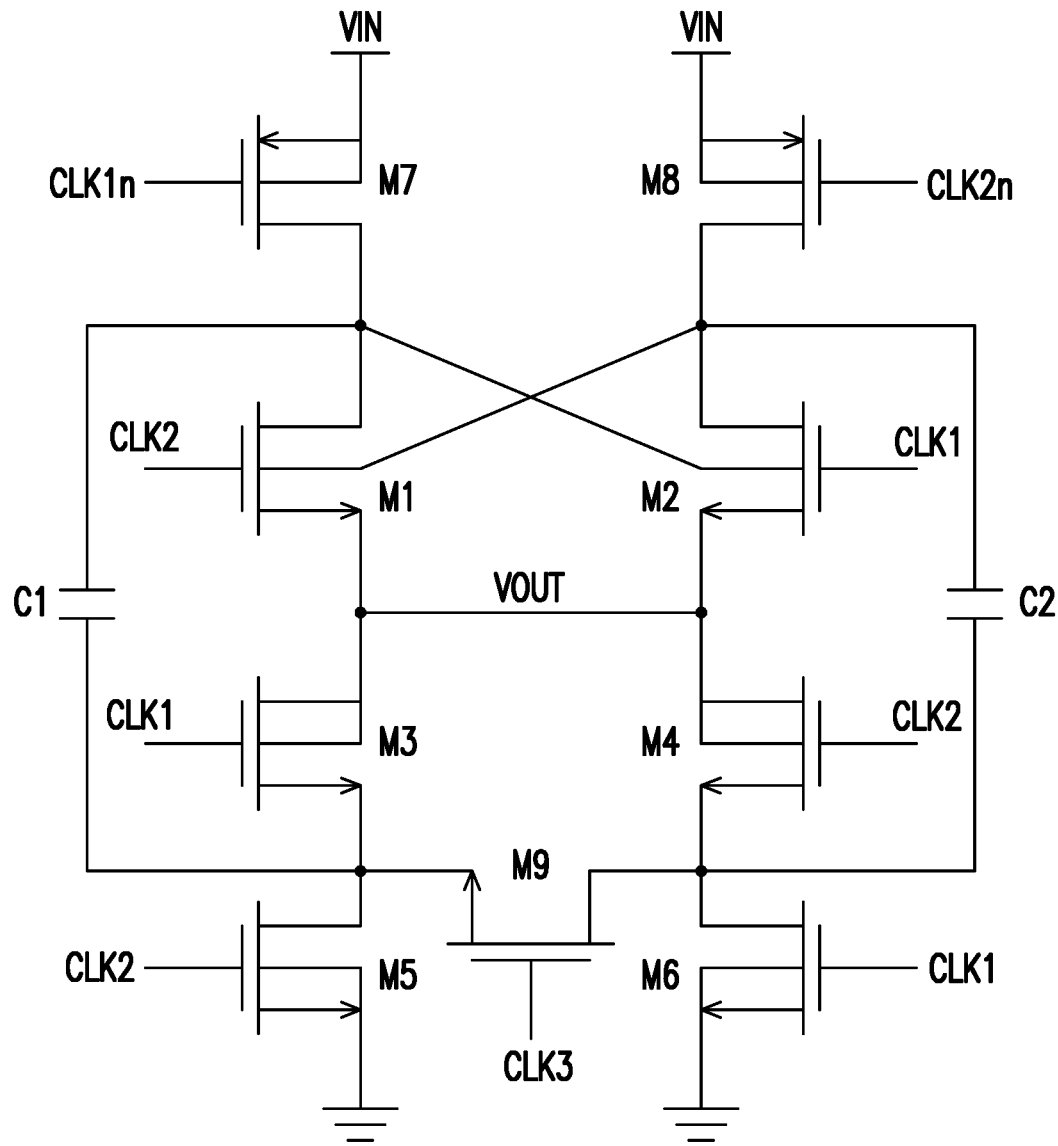
FIG. 3B is a schematic circuit diagram of a voltage conversion unit according to another embodiment of the disclosure.

Please refer to FIG. 2B, FIG. 3A, and FIG. 3B at the same time. According to an embodiment of the disclosure, FIG. 3B is a schematic circuit diagram of a voltage conversion unit according to another embodiment of the disclosure. According to an embodiment of the disclosure, the symmetric bias circuit includes the first transistor M1, the second transistor M2, the third transistor M3, the fourth transistor M4, the fifth transistor M5, the sixth transistor M6, the seventh transistor M7, the eighth transistor M8, a ninth transistor M9, the first capacitor C1, and the second capacitor C2.

Please refer to FIG. 3A and FIG. 3B. The symmetric bias circuit shown in FIG. 3B is additionally provided with the ninth transistor M9 compared with FIG. 3A, and reference may be made to FIG. 3A for the rest of the connection relationships of the transistors, which will not be repeated here. A gate terminal of the ninth transistor M9 receives the third gating clock signal CLK3, a source terminal of the ninth transistor M9 is connected to source terminals of the first capacitor C1 and the third transistor M3, and the source terminal and a drain terminal of the ninth transistor M9 are connected to the source terminal of the fourth transistor M4.

Please refer to FIG. 3B. According to an embodiment of the disclosure, when the symmetric bias circuit is during the first time interval, the first transistor M1, the fourth transistor M4, the fifth transistor M5, the eighth transistor M8, and the ninth transistor M9 are all turned off. During the second time interval, the second transistor M2, the third transistor M3, the sixth transistor M6, the seventh transistor M7, and the ninth transistor M9 are all turned off.

Figure 4:
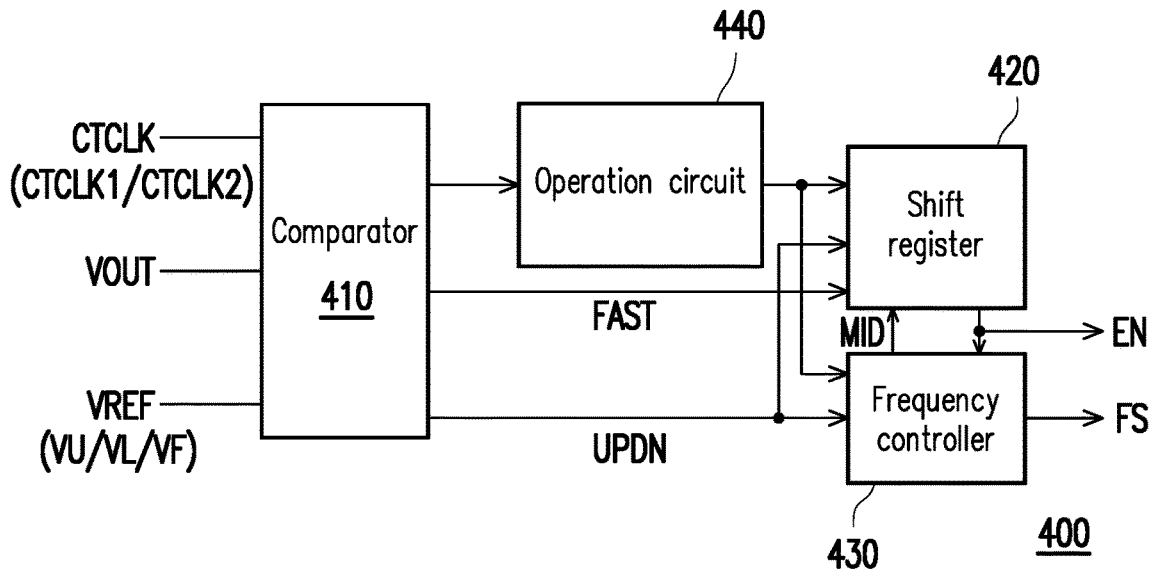
FIG. 4 is a schematic diagram of a circuit block of a voltage conversion controller according to an embodiment of the disclosure.

Please refer to FIG. 4. FIG. 4 is a schematic diagram of a circuit block of a voltage conversion controller according to an embodiment of the disclosure.

Please refer to FIG. 4. According to an embodiment of the disclosure, a voltage conversion controller 400 includes a comparator 410, a shift register 420, a frequency controller 430, and an operation circuit 440.

Please refer to FIG. 4. In the embodiment, the comparator 410 receives the output voltage VOUT of the second clock signal CTCLK, and compares the output voltage VOUT with the corresponding reference voltage VREF to output a comparison value. The comparator 410 may also receive the first control clock signal CTCLK1 and/or the second control clock signal CTCLK2. If properly designed, the first control clock signal CTCLK1 is substantially the same as the second control clock signal CTCLK2. In other words, in the embodiment, the comparator 410 may choose to simultaneously receive two independent control clock signals or choose to use only a single control clock signal, which is not limited in the embodiments of the disclosure. According to another embodiment of the disclosure, the number of the comparators 410, the reference voltage value, and the number of reference voltages may be preset according to usage requirements and are not limited to a single comparator and a single reference voltage. For example, in an embodiment, the reference voltage may be divided into three different voltage (threshold) values VU, VL, and VF.

Please refer to FIG. 4. In the embodiment, the operation circuit 440 receives the comparison value output by the comparator 410, and performs a logic operation to transmit an operation result to the shift register 420 and the frequency controller 430.

Please refer to FIG. 4. According to an embodiment of the disclosure, the comparator 410 may output a fast search signal FAST to the shift register 420 based on a comparison result after comparing with the output voltage VOUT, and instruct the shift register to execute a fast search mode. According to an embodiment of the disclosure, the comparator 410 may output a direction signal UPDN to the shift register 420 and the frequency controller 430 based on the comparison result after comparing with the output voltage VOUT. The shift register 420 receives the direction signal UPDN for bit shift left or bit shift right. The frequency controller 430 receives the direction signal UPDN to increase or decrease the switching frequency.

Please refer to FIG. 4. According to an embodiment of the disclosure, the shift register 420 receives the comparison value, the operation result of the operation circuit 440, and the direction signal UPDN, and judges using the MRSA algorithm based on the comparison value. For example, when the output voltage VOUT is less than the reference voltage VREF, according to which voltage range (refer to the description below) a voltage difference magnitude between the output voltage VOUT and the reference voltage VREF is located in, the fast search mode (for example, to execute bit shift left or bit shift right) or a normal search mode (for example, to execute bit increment or bit decrement) is selected to be executed, a corresponding bit code (for example, the DCM code) is searched, and the voltage corresponding to the bit code is output as the enable signal EN to adjust the switching frequency of the voltage conversion circuit. In other words, the voltage conversion controller 400 may control the enable signal EN based on the MRSA algorithm to adjust the switching frequency of the voltage conversion circuit. In other words, the bit code executes bit shift left, bit shift right, bit increment, or bit decrement based on the MRSA algorithm to adjust the search rate of the voltage conversion controller 400, so as to search for the bit code corresponding to the most suitable voltage range in the current clock cycle. Therefore, the voltage conversion circuit may gradually adjust the output voltage VOUT in each clock cycle to gradually restore the output voltage VOUT to a target voltage.

Please refer to FIG. 4. According to an embodiment of the disclosure, the frequency controller 430 receives the second clock signal, the operation result of the operation circuit 440, and the direction signal UPDN, and outputs a frequency selection signal FS to adjust the output frequency of the first clock signal and/or the second clock signal of the clock generator. According to an embodiment of the disclosure, the frequency controller 430 may judge that when the output voltage VOUT is in a predetermined voltage range, and when the bit code (or the enable signal EN) exceeds a predetermined threshold, the frequency selection signal FS is output to adjust the output frequency of the clock generator. In other words, by adjusting the output frequency, the frequency controller 430 may determine how much time is required by the voltage conversion circuit for switching, thereby changing the adjustment frequency of the voltage conversion circuit (or the switching frequency of the capacitor) to control the amount of charge transferred to the load per unit time, so as to adjust the conversion time of voltage conversion (or voltage correction). Besides, the frequency controller 430 outputs a reset signal MID to the shift register 420 to reset the bit code to a predetermined value (for example, to reset the bit code or the enable signal EN to a middle value of the bit code of the enable signal EN). For example, since the bit code is not reset to zero, each search of the corresponding bit code does not start from an initial state, but starts from the middle value of the bit code found this time and the bit code of the next predetermined search, so the search speed can be greatly improved.

Figure 5:
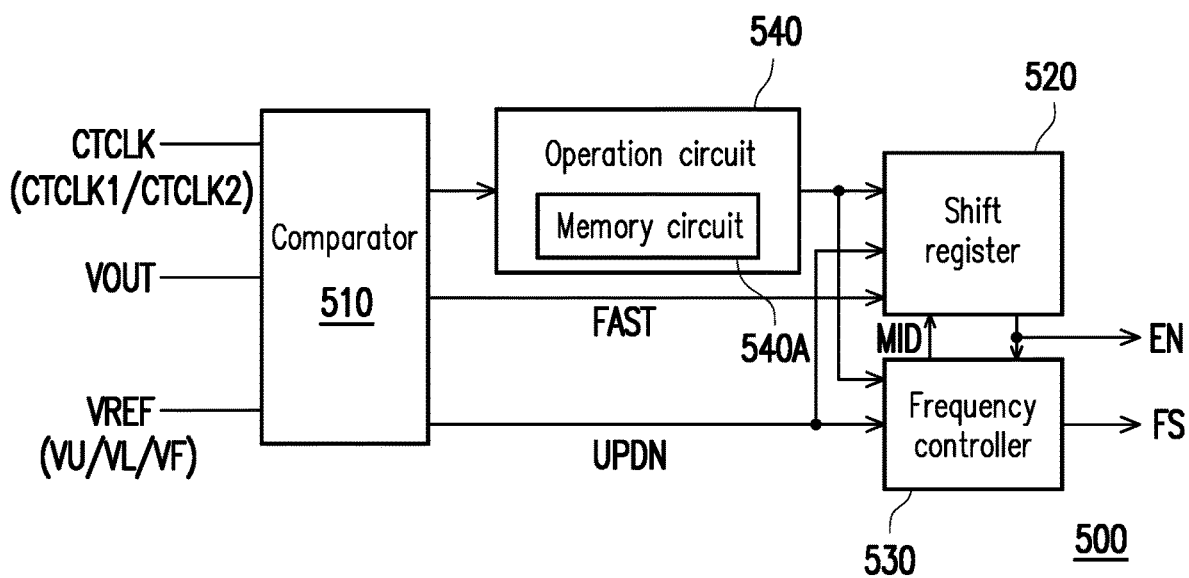
FIG. 5 is a schematic diagram of a circuit block of a voltage conversion controller according to another embodiment of the disclosure.

Please refer to FIG. 5. FIG. 5 is a schematic diagram of a circuit block of a voltage conversion controller according to another embodiment of the disclosure.

Please refer to FIG. 5. According to an embodiment of the disclosure, a voltage conversion controller 500 includes a comparator 510, a shift register 520, a frequency controller 530, an operation circuit 540, and a memory circuit 540A.

Please refer to FIG. 5. In the embodiment, the memory circuit 540A may record a comparison state of the comparator 510 between the output voltage VOUT and the reference voltage VREF (or VU/VF/VL) at the previous time, continue to search for the corresponding voltage in the next time cycle based on a result of the comparison state after a logic operation, and convert the current output voltage VOUT to the corresponding voltage, so as to gradually correct and restore the current output voltage VOUT to a predetermined target voltage range. The memory circuit 540A records a comparison result of the comparator in the previous cycle, and the shift register 520 records a voltage search result of the previous cycle. Therefore, in the next time cycle, there is no need to start the search and correction from an initial voltage state, which can improve the voltage searching and conversion time. Please refer to FIG. 5. Reference may be made to FIG. 4 and the above description for the rest of the connection relationships of the circuit elements, which will not be repeated here.

Figure 6:
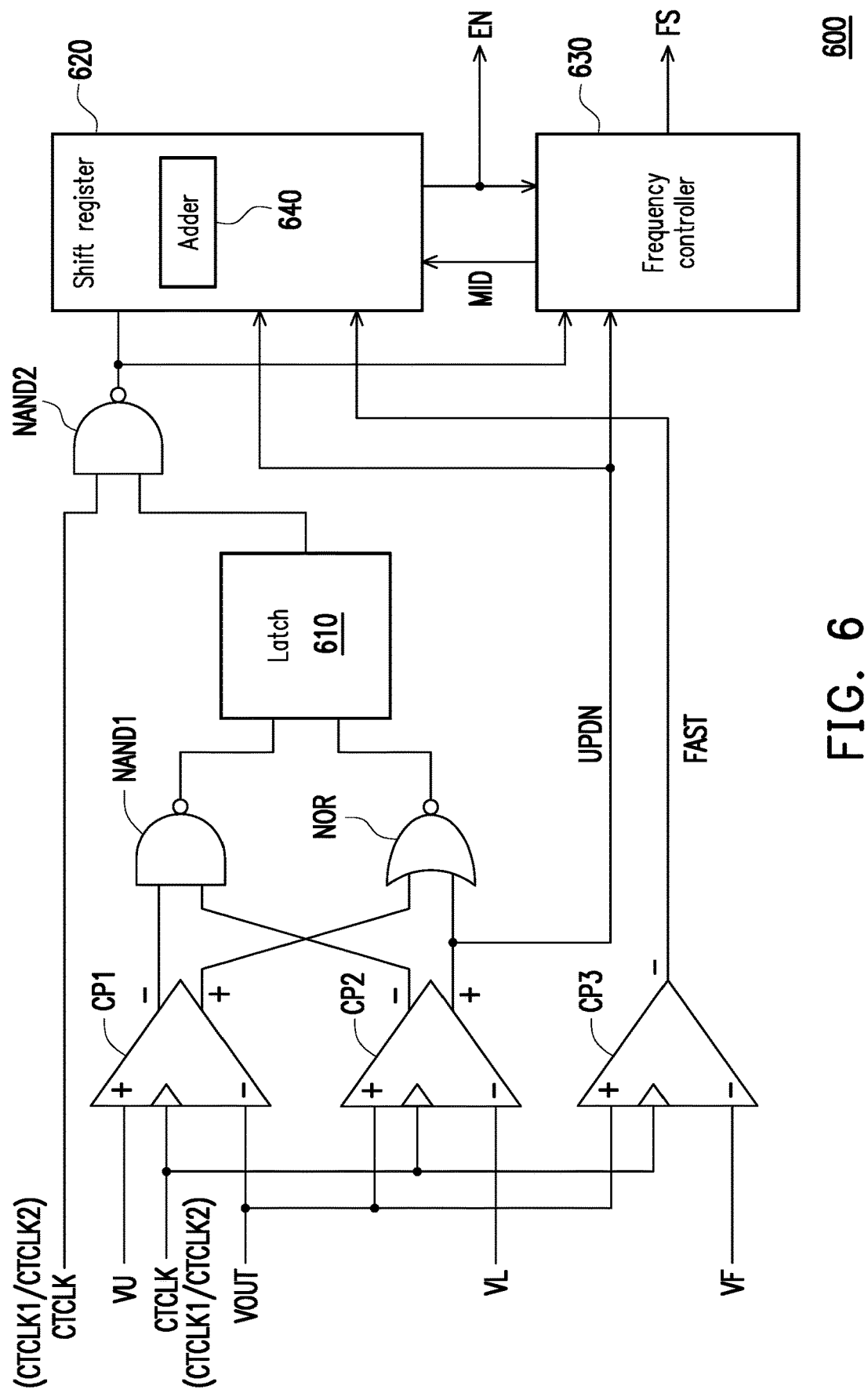
FIG. 6 is a schematic diagram of a circuit block of a voltage conversion controller according to another embodiment of the disclosure.

Please refer to FIG. 6. FIG. 6 is a schematic diagram of a circuit block of a voltage conversion controller according to another embodiment of the disclosure. According to an embodiment of the disclosure, a voltage conversion controller 600 includes comparators CP1, CP2, and CP3, a latch 610, a shift register 620, a frequency controller 630, an adder 640, two NAND gates NAND1 and NAND2, and a NOR gate NOR.

Please refer to FIG. 6. According to an embodiment of the disclosure, the comparators CP1, CP2, and CP3 receive the second clock signal CTCLK at clock input terminals, the comparator CP1 receives the output voltage VOUT at an inverting input terminal, and the comparators CP2 and CP3 receive the output voltage VOUT at non-inverting input terminals. According to another embodiment of the disclosure, the comparators CP1, CP2, and CP3 receive the first control clock signal CTCLK1 or the second control clock signal CTCLK2 at the clock input terminals. According to an embodiment of the disclosure, the comparator CP1 receives a predetermined reference voltage VU at a non-inverting input terminal, the comparator CP2 receives a predetermined reference voltage VL at an inverting input terminal, and the comparator CP3 receives a predetermined reference voltage VF at an inverting input terminal. If the output voltage VOUT is greater than the reference voltage VU, the comparator CP1 outputs a comparison result to one of the input terminals of the NAND gate NAND1. Conversely, if the output voltage VOUT is less than the reference voltage VU, the comparator CP1 outputs a comparison result to one of the input terminals of the NOR gate NOR. If the output voltage VOUT is greater than the reference voltage VL, the comparator CP2 outputs a comparison result to the other one of the input terminals of the NOR gate NOR, and transmits the comparison result as the direction signal UPDN to the shift register 620 and the frequency controller 630 to instruct the shift register 620 and the frequency controller 630 to execute the normal search mode (for example, bit increment or bit decrement). Conversely, if the output voltage VOUT is less than the reference voltage VL, the comparator CP1 outputs a comparison result to the other one of the input terminals of the NAND gate NAND1. If the output voltage VOUT is less than the reference voltage VF, the comparator CP2 transmits a comparison result as the fast search signal FAST to the shift register 620 to instruct the shift register to execute the fast search mode (for example, bit shift left or bit shift right). The NAND gate NAND1 and the NOR gate NOR may perform logic operations on signals received from the comparators CP1 and CP2 and transmit operation results to the latch 610.

Please refer to FIG. 6. The latch 610 may be a latch composed of an SR flip-flop, which is not limited herein. The latch 610 may be used as clock gating to memorize the comparison state of the current time cycle without changing the state of the signal in the next cycle. Therefore, the switching of the clock signal can be reduced, which can effectively reduce the dynamic power loss of the circuit, and at the same time, the clock tree structure can be optimized to reduce setup timing and increase the efficiency of the voltage conversion. The NAND gate NAND2 may receive a signal from the latch 610 and the second clock signal CTCLK (or one of the first control clock signal CTCLK1 and the second control clock signal CTCLK2), and transmit an operation result to the shift register 620 and the frequency controller 630. If the voltage is already in or restored to a target range (for example, a state IDLE described below), the NAND gate NAND2 will not execute. Please refer to FIG. 6. Reference may be made to FIG. 4 and the above description for the rest of the connection relationships of the circuit elements, which will not be repeated here.

Figure 7:
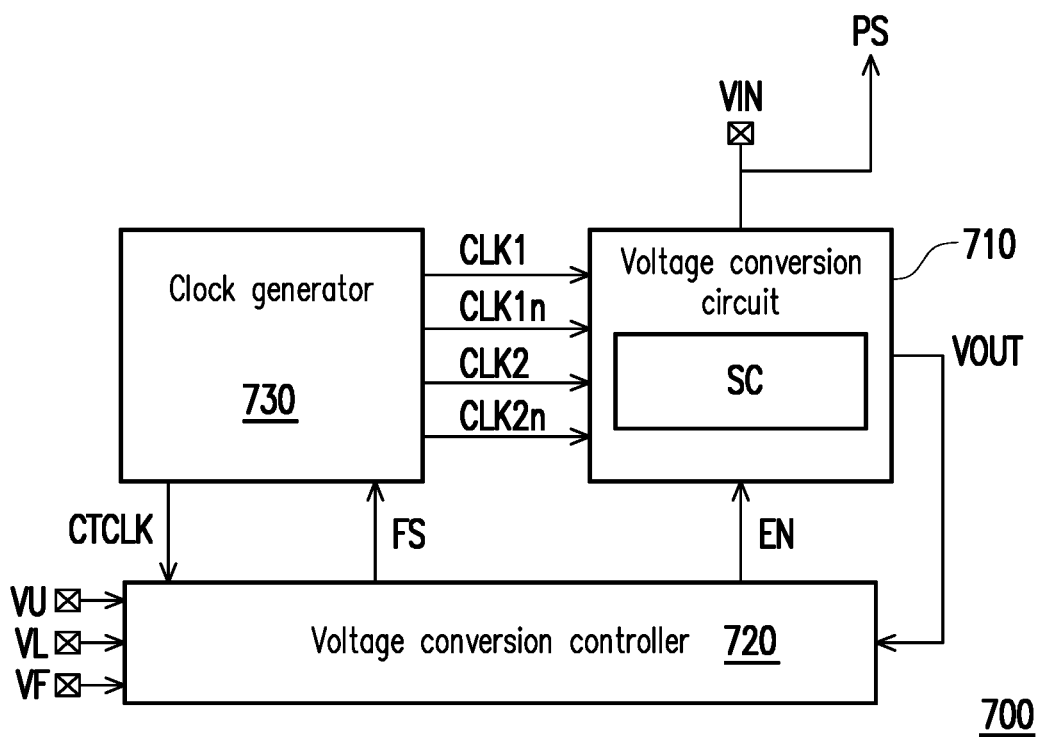
FIG. 7 is a schematic diagram of a circuit block of an adjustable voltage regulator circuit according to an embodiment of the disclosure.

Please refer to FIG. 7. FIG. 7 is a schematic diagram of a circuit block of an adjustable voltage regulator circuit according to an embodiment of the disclosure. An adjustable voltage regulator circuit 700 includes a voltage conversion circuit 710, a voltage conversion unit SC, a voltage conversion controller 720, and a clock generator 730.

Please refer to FIG. 7 and FIG. 3A. The voltage conversion unit SC in the voltage conversion circuit 710 receives the first gating clock signal CLK1, the inverse first gating clock signal CLK1n, the second gating clock signal CLK2, and the inverse second gating clock signal CLK2n provided by the clock generator 730, and perform state switching of an internal circuit of the voltage conversion unit SC in different time intervals according to the gating clock signals. The voltage conversion circuit 710 also receives the input voltage VIN provided by a power supply PS as a bias voltage for the internal circuit of the voltage conversion unit SC. The voltage conversion controller 720 receives the second clock signal CTCLK provided by the clock generator 730. The voltage conversion controller 720 continuously detects the output voltage VOUT and a corrected output voltage (that is, a feedback voltage) of the voltage conversion circuit 710 between the first clock cycle and the second clock cycle, and outputs the enable signal EN based on the comparison between the feedback voltage of the voltage conversion circuit 710 and the reference voltages VU, VF, and VL to adjust the switching frequency of the internal circuit of the voltage conversion unit SC. In addition, the voltage conversion controller 720 may also output the frequency selection signal FS to adjust the output frequency of the clock generator.

Figure 8:
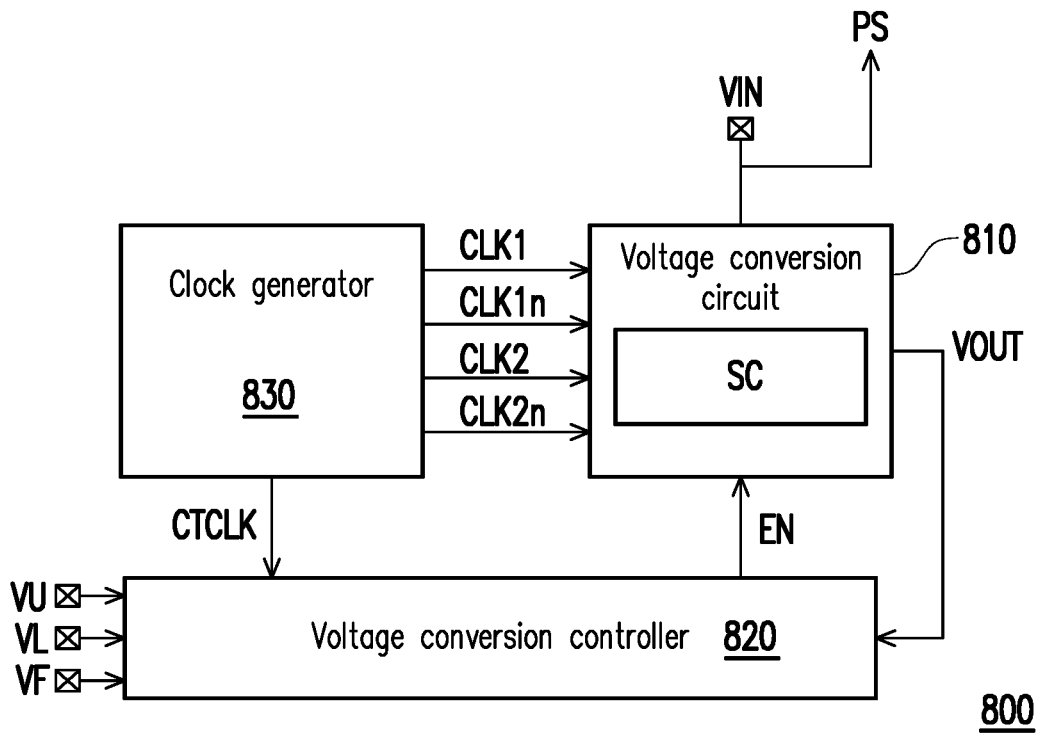
FIG. 8 is a schematic diagram of a circuit block of an adjustable voltage regulator circuit according to another embodiment of the disclosure.

Please refer to FIG. 8 and FIG. 7. FIG. 8 is a schematic diagram of a circuit block of an adjustable voltage regulator circuit according to another embodiment of the disclosure. According to another embodiment of the disclosure, an adjustable voltage regulator circuit 800 includes a voltage conversion circuit 810, a voltage conversion unit SC, a voltage conversion controller 820, and a clock generator 830. Please refer to FIG. 8. The difference between FIG. 8 and FIG. 7 is whether the voltage conversion controller 820 has the frequency selection signal FS. Reference may be made to the description above for the rest of the related configurations.

Figure 9:
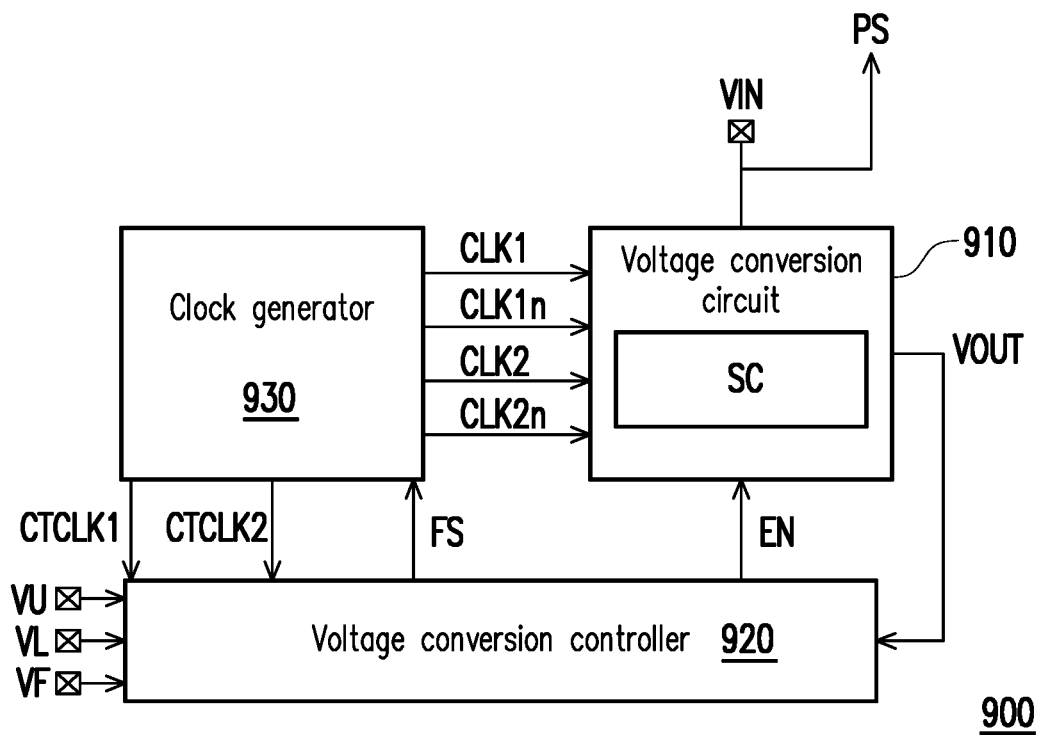
FIG. 9 is a schematic diagram of a circuit block of an adjustable voltage regulator circuit according to another embodiment of the disclosure.

Please refer to FIG. 9 and FIG. 7. FIG. 9 is a schematic diagram of a circuit block of an adjustable voltage regulator circuit according to another embodiment of the disclosure. According to another embodiment of the disclosure, an adjustable voltage regulator circuit 900 includes a voltage conversion circuit 910, a voltage conversion unit SC, a voltage conversion controller 920, and a clock generator 930. The difference between FIG. 9 and FIG. 7 is whether the voltage conversion controller 920 receives the first control clock signal CTCLK1 and the second control clock signal CTCLK2. Reference may be made to the description above for the rest of the related configurations.

Figure 10:
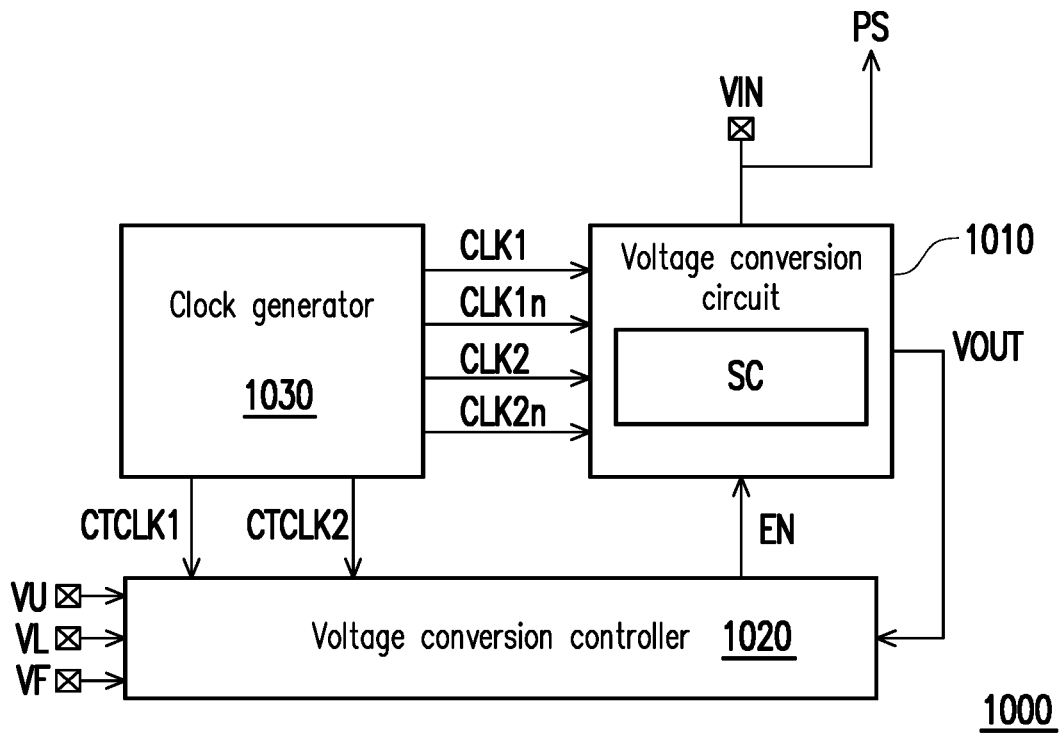
FIG. 10 is a schematic diagram of a circuit block of an adjustable voltage regulator circuit according to another embodiment of the disclosure.

Please refer to FIG. 10 and FIG. 7. FIG. 10 is a schematic diagram of a circuit block of an adjustable voltage regulator circuit according to another embodiment of the disclosure. According to another embodiment of the disclosure, an adjustable voltage regulator circuit 1000 includes a voltage conversion circuit 1010, a voltage conversion unit SC, a voltage conversion controller 1020, and a clock generator 1030. The difference between FIG. 10 and FIG. 7 is whether the voltage conversion controller 1020 has the frequency selection signal FS and whether the voltage conversion controller 1020 receives the first control clock signal CTCLK1 and the second control clock signal CTCLK2. Reference may be made to the description above for the rest of the related configurations.

Figure 11:
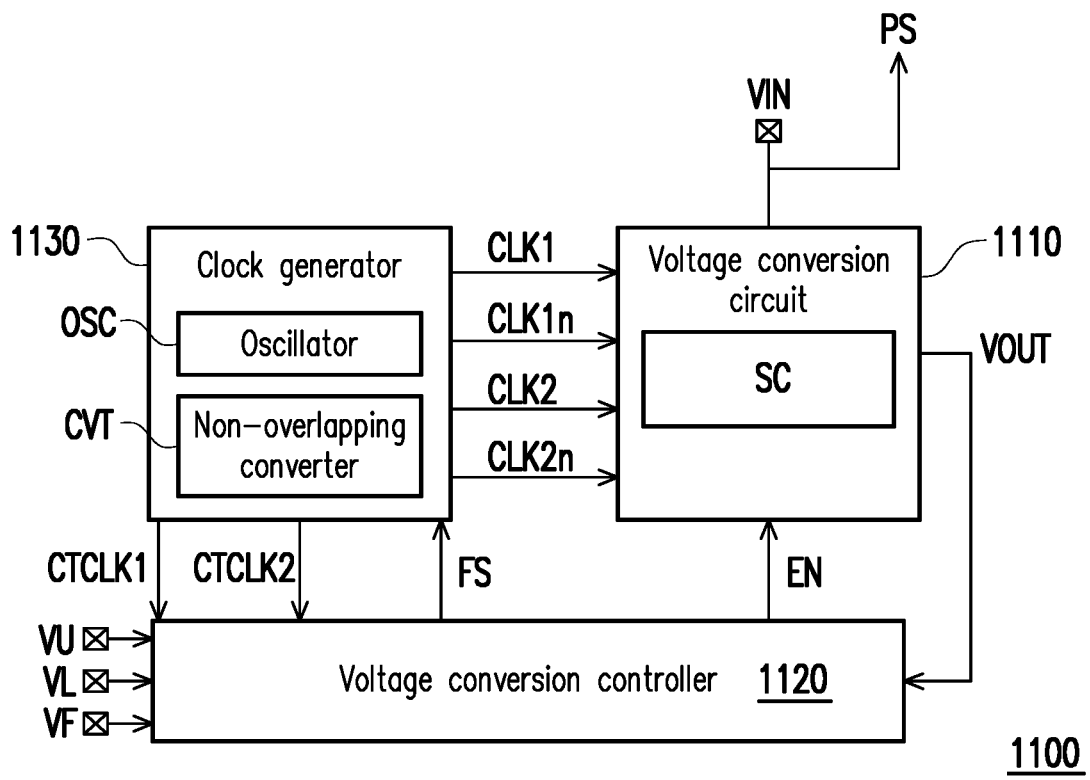
FIG. 11 is a schematic diagram of a circuit block of an adjustable voltage regulator circuit according to another embodiment of the disclosure.

Please refer to FIG. 11 and FIG. 7. FIG. 11 is a schematic diagram of a circuit block of an adjustable voltage regulator circuit according to another embodiment of the disclosure. According to another embodiment of the disclosure, an adjustable voltage regulator circuit 1100 includes a voltage conversion circuit 1110, a voltage conversion unit SC, a voltage conversion controller 1120, a clock generator 1130, an oscillator OSC, and a non-overlapping converter CVT. The oscillator OSC may be a digital control oscillator, and the type of the oscillator OSC is not limited in the embodiments of the disclosure. The non-overlapping converter CVT may control the first gating clock signal CLK1 and the inverse first gating clock signal CLK1n to be spaced apart from the second gating clock signal CLK2 and the inverse second gating clock signal CLK2n in different cycles (see FIG. 12 below) without overlapping each other. According to the configuration of the non-overlapping converter CVT, the transistor switches that should be turned off and should be turned on can be prevented from being turned on at the same time to prevent the formation of a short-circuit path between Vin and GND, so as to prevent the circuit from malfunctioning during state switching and affecting the efficiency and correctness of voltage conversion. Reference may be made to the above for the description of the rest of the related configurations, which will not be repeated here.

Figure 12:
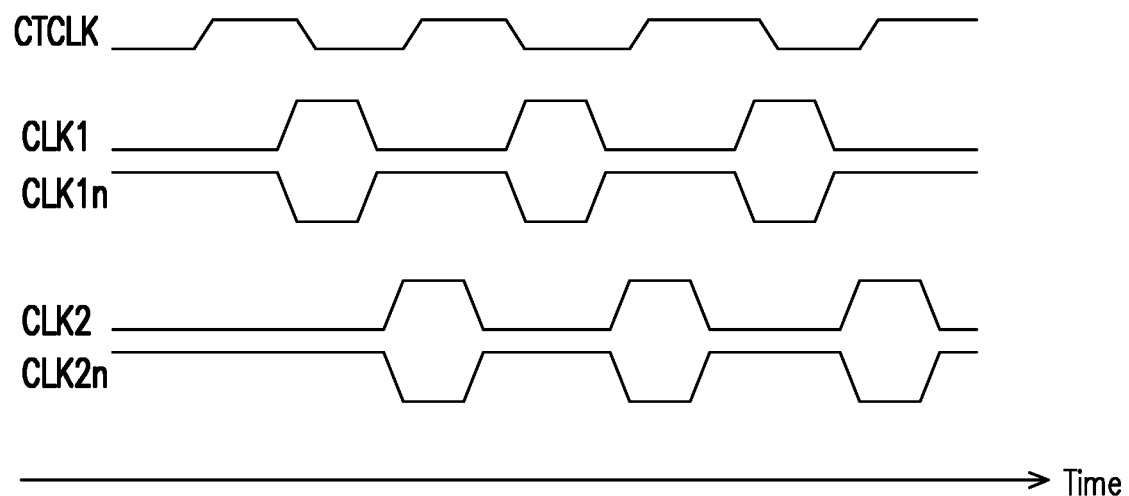
FIG. 12 is an action waveform diagram changing with time of a clock generator according to an embodiment of the disclosure.

Please refer to FIG. 12. FIG. 12 is a waveform diagram changing with time of a clock generator according to an embodiment of the disclosure. After receiving the second clock signal CTCLK, the voltage conversion controller generates the enable signal to select the voltage conversion unit to be turned on. The voltage conversion unit then receives the first gating clock signal CLK1 and the inverse first gating clock signal CLK1n, and the second gating clock signal CLK2 and the inverse second gating clock signal CLK2n in different cycles. The first gating clock signal CLK1 and the inverse first gating clock signal CLK1n are transmitted to the voltage conversion unit together in the same cycle. The second gating clock signal CLK2 and the inverse second gating clock signal CLK2n are transmitted together to the voltage conversion unit in the same cycle.

Figure 13A:
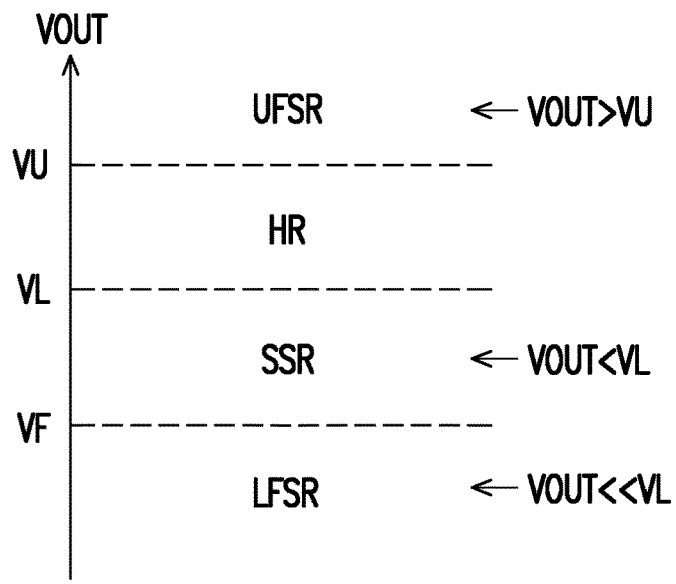
FIG. 13A is a schematic diagram of a range of an output voltage and a reference voltage according to an embodiment of the disclosure.

Please refer to FIG. 13A. FIG. 13A is a schematic diagram of a range of an output voltage and a reference voltage according to an embodiment of the disclosure. According to an embodiment of the disclosure, the voltage conversion controller may at least determine one or more reference voltage values including a first reference voltage value VU, a second reference voltage value VL, and a third reference voltage value VF based on the MRSA algorithm. The first reference voltage value VU, the second reference voltage value VL, and the third reference voltage value VF may divide the output voltage VOUT into four voltage ranges, which are respectively an upper voltage fast search region UFSR, a voltage hysteresis region HR, a normal search region SSR, and a lower voltage fast search region LFSR. A predetermined voltage range (that is, a target voltage range) is between the first reference voltage value VU and the second reference voltage value VL. A region between the second reference voltage value VL and the third reference voltage value VF is a first search region (that is, the normal search region SSR), a region lower than the third reference voltage value VF is a second search region (that is, the lower voltage fast search region LFSR), and a region higher than the first reference voltage value VU is a third search region (that is, the upper voltage fast search region UFSR). A search rate used by the voltage conversion controller in the first search region (that is, the normal search region SSR) is different from a search rate used in the second search region (that is, the lower voltage fast search region LFSR). When the output voltage VOUT is greater than the first reference voltage value VU, the voltage conversion controller may judge that the location is in the upper voltage fast search region UFSR at this time. When the output voltage VOUT is less than the second reference voltage value VL, the voltage conversion controller may judge that the location is the normal search region SSR at this time. When the output voltage VOUT is much less than the second reference voltage value VL (for example, less than 8 to 10 mV), the voltage conversion controller may judge that the location is in the lower voltage fast search region LFSR. The first reference voltage value VU is about 1.05 to 1.01 times the second reference voltage value VL, and the third reference voltage value VF is about 0.9 to 0.95 times the second reference voltage value VL. The reference voltage value may be set according to requirements.

Figure 13B:
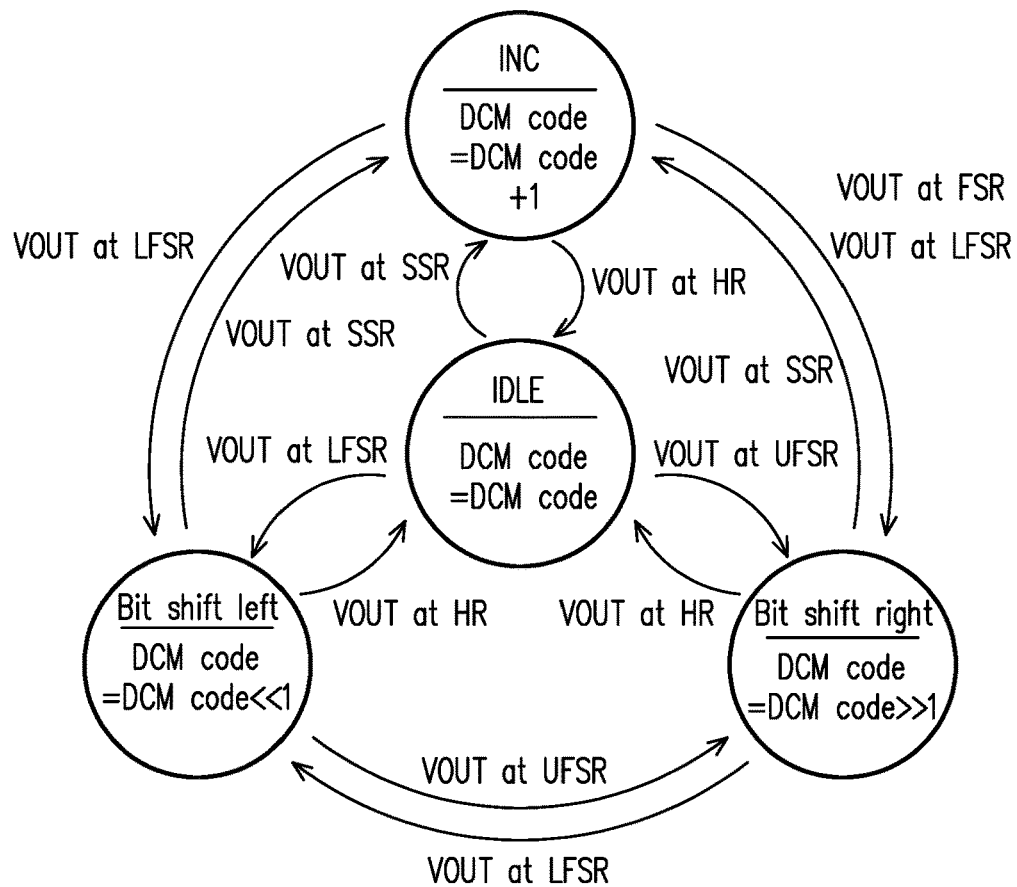
FIG. 13B is a finite state transition diagram of a DCM code according to an embodiment of the disclosure.

Please refer to FIG. 13B. FIG. 13B is a finite state transition diagram of a DCM code according to an embodiment of the disclosure. When a voltage is in an initial state and is restored to a predetermined voltage range, the state is in the state IDLE. At this time, the DCM code has correctly searched for a bit code corresponding to a target voltage, so the DCM code does not change and the voltage is not converted.

The initial state is in the state IDLE. When the output voltage VOUT is in an SSR range, the state is transferred from the state IDLE to a state INC. At this time, increment (that is, bit add one using an adder, DCM code=DCM code+1) may be performed on the DCM code generated by the voltage conversion controller. If the output voltage VOUT is detected in an LFSR range in the next cycle, bit shift left is performed. If the output voltage VOUT is detected in an FSR range in the next cycle, bit shift right is performed. if the output voltage VOUT is detected in an HR range in the next cycle, the state returns to the state IDLE again.

The initial state is in the state IDLE. When the output voltage VOUT is in the LFSR range, the state is transferred from the state IDLE to a bit shift left state. At this time, bit shift left (that is, bit shift left and fill 1 using a shift register, DCM code=DCM code<<1) may be performed on the DCM code generated by the voltage conversion controller to achieve the effect of multiplying the bit code by two. If the output voltage VOUT is detected in an UFSR range in the next cycle, bit shift right and fill 0 is performed (that is, bit shift right is performed using the shift register, DCM code=DCM code>>1) to achieve the effect of dividing the bit code by two. If the output voltage VOUT is detected in the SSR range in the next cycle, increment is performed. If the output voltage VOUT is detected in the HR range in the next cycle, the state returns to the state IDLE again.

The initial state is in the state IDLE. When the output voltage VOUT is in the UFSR range, the state is transferred from the state IDLE to a bit shift right state. At this time, bit shift right may be performed on the DCM code generated by the voltage conversion controller. If the output voltage VOUT is detected in the LFSR range in the next cycle, bit shift left is performed. If the output voltage VOUT is detected in the SSR range in the next cycle, increment is performed. If the output voltage VOUT is detected in the HR range in the next cycle, the state returns to the state IDLE again.

Figure 13C:
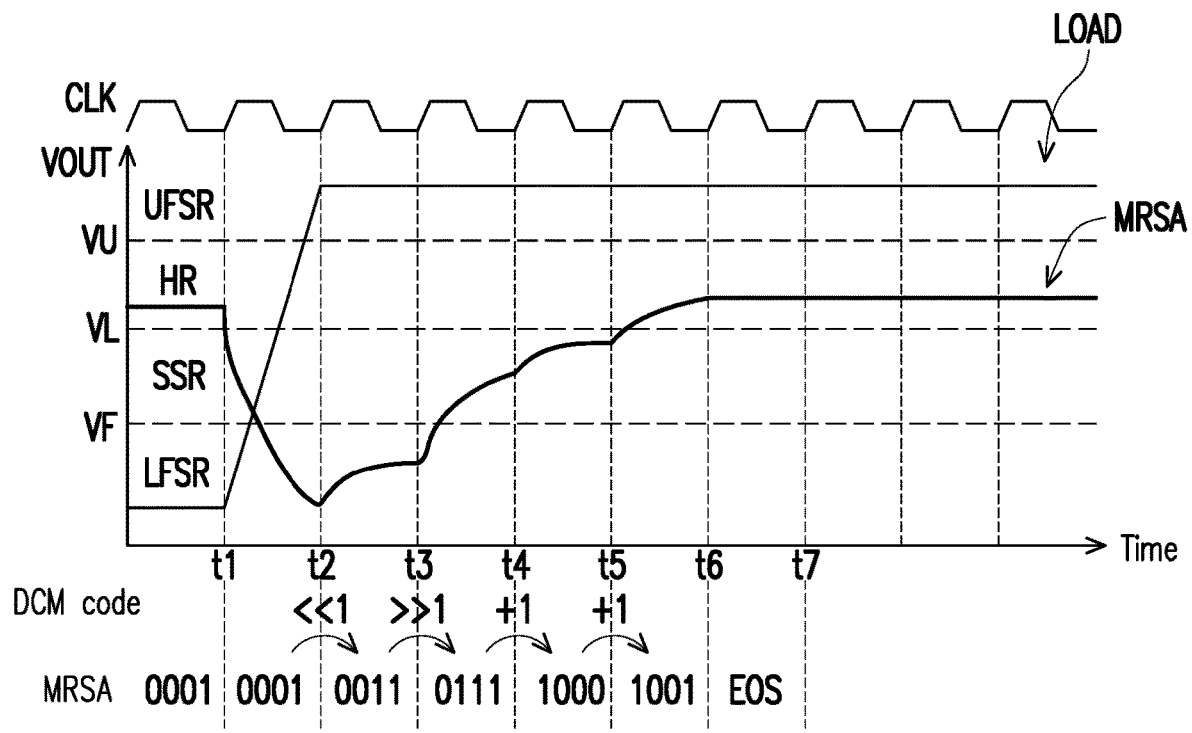
FIG. 13C is a schematic diagram of conversion of a DCM code and corresponding voltage conversion according to an embodiment of the disclosure.

Please refer to FIG. 13C and FIG. 13B. FIG. 13C is a schematic diagram of conversion of a DCM code and corresponding voltage conversion according to an embodiment of the disclosure. Before a time t1, the initial output voltage VOUT is in the HR range (the DCM code is, for example, 0001 at this time). At the time t1, an output load curve LOAD changes, which causes the output voltage to drop from the HR range to lower than the reference voltage VF between the time t1 and a time t2. Therefore, the voltage conversion controller searches or adjusts according to the DCM code (0001) corresponding to the initial voltage and the MRSA algorithm. Therefore, after the time t2, bit shift left is performed on the original DCM code (0001) and 1 is filled at the rightmost LSB to become 0011. At this time, the output voltage VOUT is still lower than the reference voltage VF (located in the LFSR range), so according to the algorithm, bit shift left continues to be executed, and after a time t3, the DCM code becomes 0111. At this time, the output voltage VOUT is lower than the reference voltage VL (in the SSR range), so according to the algorithm, bit increment continues to be executed, and after a time t4, the DCM code becomes 1000. At this time, the output voltage VOUT is still lower than the reference voltage VL (in the SSR range), so according to the algorithm, bit increment continues to be executed, and after a time t5, the DCM code becomes 1001. At this time, the output voltage VOUT is restored to a target voltage range HR, so the end of search (EOS) occurs at times t6 and t7. Based on the above, the DCM code may be gradually adjusted based on the MRSA algorithm to convert the output voltage to the target voltage range HR. In addition, the voltage conversion controller has the same adjustment frequency (that is, the search rates for bit shift left and bit shift right are substantially the same) in a second search region LFSR and a third search region UFSR. The search rate used in a first search region SSR is lower than the search rate used in the second search region LFSR (that is, the search rate for bit increment is less than the search rate for bit shift left and/or bit shift right). In other words, the search rate used in the first search region SSR is different from the search rate used in the third search region UFSR.

Figure 13D:
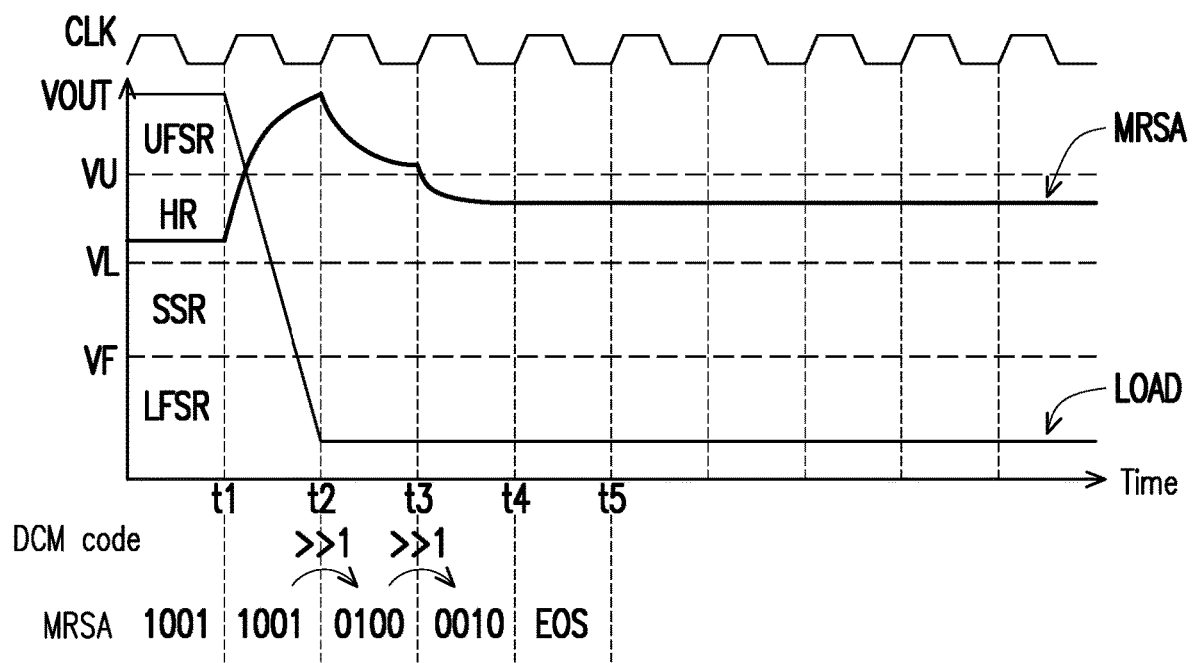
FIG. 13D is a schematic diagram of conversion of a DCM code and corresponding voltage conversion according to another embodiment of the disclosure.

Please refer to FIG. FIGS. 13D and 13B. FIG. 13D is a schematic diagram of conversion of a DCM code and corresponding voltage conversion according to another embodiment of the disclosure. Before the time t1, the initial output voltage VOUT is in the HR range (the DCM code is, for example, 1001 at this time). At the time t1, the output load curve LOAD changes, which causes the output voltage to rise from the HR range to higher than the reference voltage VU between the times t1 and t2. Therefore, the voltage conversion controller searches or adjusts according to the DCM code (1001) corresponding to the initial voltage and the MRSA algorithm. Therefore, after the time t2, bit shift right is performed on the original DCM code (1001) and 0 is filled at the leftmost MSB to become 0100. At this time, the output voltage VOUT is still higher than the reference voltage VU (in the UFSR range), so according to the MRSA algorithm, bit shift right continues to be executed, and after the time t2, the DCM code becomes 0010. At this time, the output voltage VOUT is restored to the target voltage range HR, so the end of search (EOS) occurs at the times t4 and t5. Based on the above, the DCM code may be gradually adjusted based on the MRSA algorithm to convert the output voltage to the target voltage range HR. In addition, the voltage conversion controller has the same adjustment frequency (that is, the search rates for bit shift left and bit shift right are substantially the same) in the second search region LFSR and the third search region UFSR. The search rate used in the first search region SSR is lower than the search rate used in the second search region LFSR (that is, the search rate for bit increment is less than the search rate for bit shift left and/or bit shift right). In other words, the search rate used in the first search region SSR is different from the search rate used in the third search region UFSR.

Figure 14:
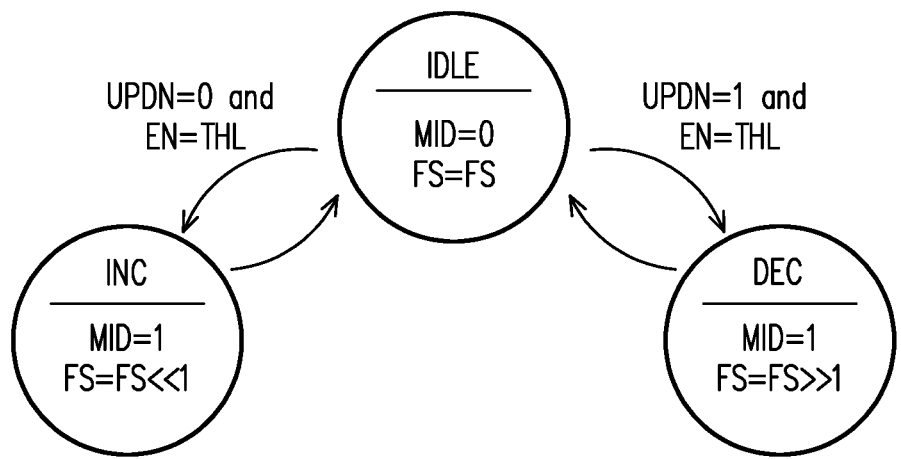
FIG. 14 is a finite state transition diagram of a frequency controller according to an embodiment of the disclosure.

Please refer to FIG. 14 and FIG. 4. FIG. 14 is a finite state transition diagram of a frequency controller according to an embodiment of the disclosure. An initial frequency state is in the state IDLE. At this time, the reset signal MID is zero (that is, the operation of resetting to the middle value of the enable signal EN is not performed), and the frequency selection signal FS does not change. If the direction signal UPDN is logic 1 in the next cycle, and the enable signal EN is equal to a threshold upper bound THU, in other words, the output voltage at this time exceeds the target voltage, based on the MRSA algorithm, the bit code of the enable signal EN tends to be reduced. Therefore, the frequency controller enters a state DEC, and bit shift right is performed on the frequency selection signal FS (that is, FS=FS<<1) to reduce the output frequency of the clock generator, thereby reducing the switching frequency of the voltage conversion unit. At the same time, the reset signal MID is set to logic 1, so that the next search may start from the middle value without returning to the initial voltage state, so the speed of frequency selection can be improved. If the target voltage is reached in the next cycle, the state may return to the state IDLE.

Similarly, the initial frequency state is in the state IDLE. If the direction signal UPDN is logic 0 in the next cycle, and the enable signal EN is equal to a threshold lower bound THL, in other words, the output voltage at this time is lower than the target voltage, based on the MRSA algorithm, the bit code of the enable signal EN tends to be increased. Therefore, the frequency controller enters the state INC, bit shift left is performed on the frequency selection signal FS (that is, FS=FS>>1) to increase the output frequency of the clock generator, and indirectly increase the switching frequency of the voltage conversion unit. At the same time, the reset signal MID is set to logic 1. If the target voltage is reached in the next cycle, the state may return to the state IDLE.

Figure 15:
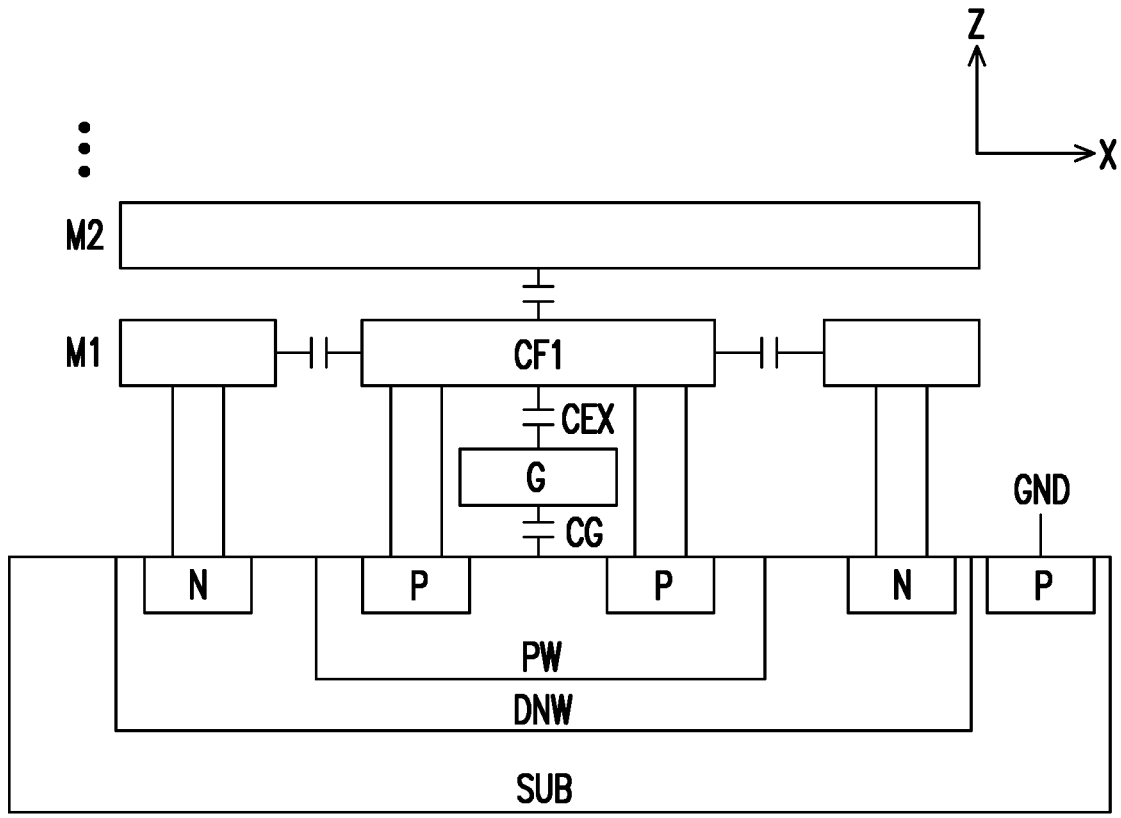
FIG. 15 is a schematic diagram of a semiconductor element structure of a flying capacitor in a voltage conversion unit and a corresponding interior inductive capacitor diagram according to an embodiment of the disclosure.

Please refer to FIG. 15. FIG. 15 is a schematic diagram of a semiconductor element structure of a flying capacitor in a voltage conversion unit and a corresponding interior inductive capacitor diagram according to an embodiment of the disclosure. In the embodiment, a semiconductor element structure 1500 of the flying capacitor in the voltage conversion unit may be composed of a semiconductor substrate SUB, a deep N-type well region DNW, a P-type well region PW, a first metal layer M1, a second metal layer M2, a first flying capacitor unit CF1, and multiple source regions N and P and/or drain regions N and P formed by N-type and P-type semiconductors. The P-type source (drain) region separated by the deep N-type well region DNW is connected to the ground GND. The source region and/or the drain region formed by the P-type semiconductor located in the P-type well region may be connected to the first metal layer M1 through vias. There is a gate G overlapping with the first metal layer M1 and located between the vias under the first metal layer M1. Therefore, in the element structure of the semiconductor elements constituting the flying capacitor, a gate coupling capacitor CG between the gate G and a top surface of the P-type well region PW may be generated.

Please refer to FIG. 15, FIG. 3A, and FIG. 3B. All capacitors in FIG. 15 may be equivalent to one flying capacitor (that is, the first capacitor C1 and/or the second capacitor C1 exemplified in FIG. 3A and FIG. 3B). In other words, the flying capacitor at least includes a flying capacitor unit CF1 and other coupling capacitors between metal layers, and the sum of the capacitance values of the flying capacitor unit CF1 and the other coupling capacitors may be equivalent to the capacitance value of the flying capacitor. In particular, with such element structure configuration, a coupling inductive capacitor CEX may be additionally generated at the overlap between the first metal layer M1 and the gate G. The first flying capacitor unit CF1 is formed by connecting the coupling inductive capacitor CEX and the gate coupling capacitor CG in parallel. The coupling inductive capacitor CEX additionally generated by the physical layout design may increase the capacitance density in the semiconductor elements of the voltage conversion unit.

Figure 16:
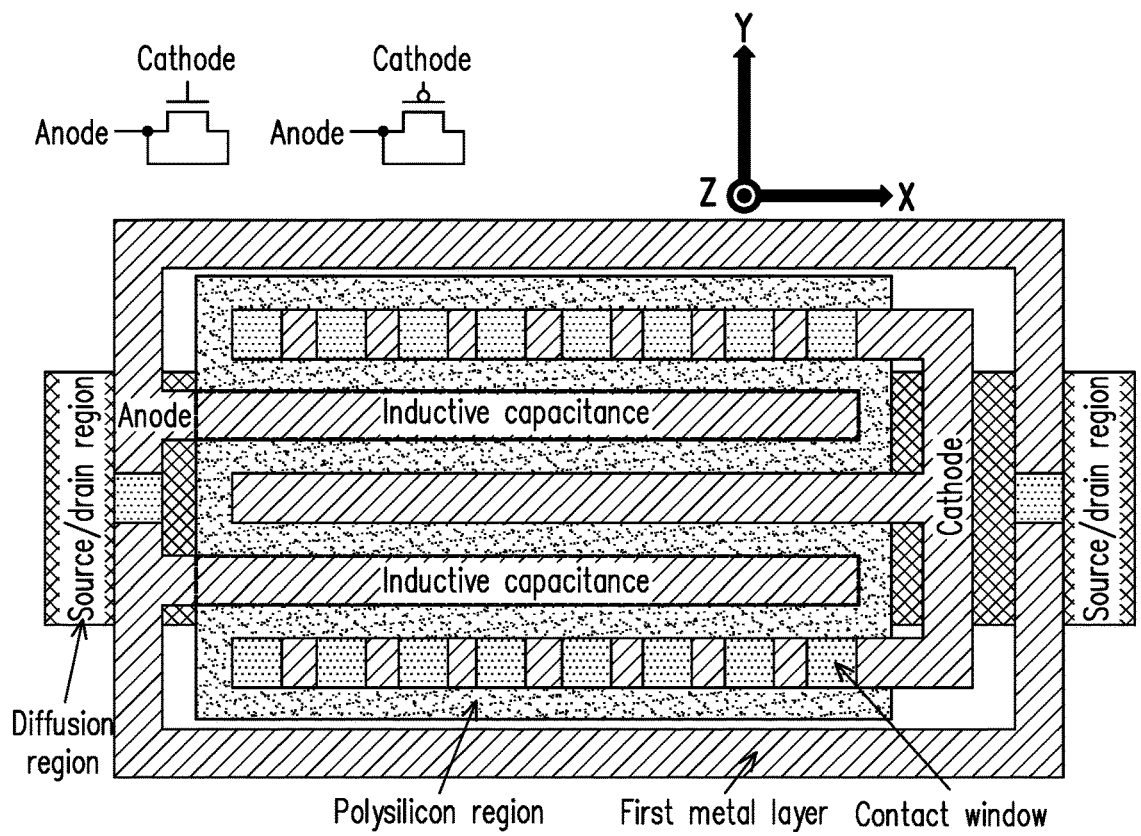
FIG. 16 is a physical design layout diagram of an integrated circuit of a voltage conversion unit according to an embodiment of the disclosure.

Please refer to FIG. 16. FIG. 16 is a top view of a physical design layout diagram of an integrated circuit of a voltage conversion unit according to an embodiment of the disclosure. The physical design layout includes an anode region, a cathode region, a polysilicon region, a contact window, a diffusion region, a source/drain region. The anode region and the cathode region are designed in a finger interleaved layout, and the number of fingers interleaved between the cathode region and the anode region is not limited. The part where the polysilicon region overlaps with the first metal layer, that is, the part where the anode region overlaps with the polysilicon region (shown by the dotted lines in the drawing), is the region where the inductive capacitor is. It should be understood that the location of the inductive capacitor is only indicative of the location of the overlapping part and is not on the uppermost layer.

Figure 17:
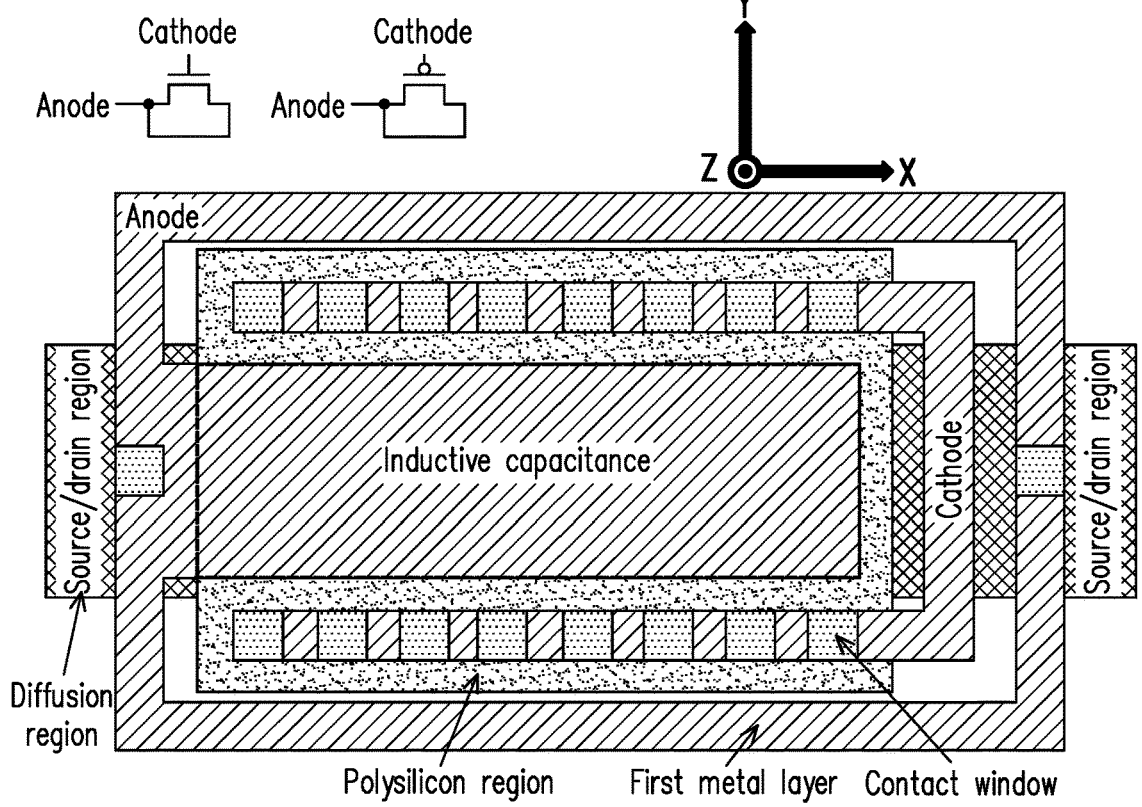
FIG. 17 is a physical design layout diagram of an integrated circuit of a voltage conversion unit according to another embodiment of the disclosure.

Please refer to FIG. 17. FIG. 17 is a top view of a physical design layout diagram of an integrated circuit of a voltage conversion unit according to another embodiment of the disclosure. The physical design layout includes an anode region, a cathode region, a polysilicon region, a contact window, a diffusion region, and a source/drain region. The anode region and the cathode region are designed in an interdigitated layout, and the number of fingers crossed between the cathode region and the anode region is not limited. In particular, in the embodiment, a middle finger part of the anode region has a larger layout area than two side finger parts, so the middle finger part can have a larger inductive capacitor region. In other words, a larger inductive capacitor can be formed.

Please refer to FIG. 15, FIG. 16, FIG. 17, FIG. 3A, and FIG. 3B. At least one of the first capacitor and the second capacitor of the symmetric bias circuit forms an additional third capacitor CEX between the first metal layer M1 and the gate G of at least one of the first capacitor and the second capacitor when configuring the physical design layout. In other words, the third capacitor CEX may correspond to the additionally generated coupling inductive capacitor in FIG. 16 and FIG. 17.

In summary, the adjustable voltage regulator circuit according to the embodiments of the disclosure can flexibly and gradually adjust the DCM code according to actual requirements of the target voltage based on the MRSA algorithm to speed up the search speed of searching for the DCM code corresponding to the voltage and improve the efficiency of the voltage conversion. In addition, the MRSA algorithm can effectively prevent the reset state of the DCM control code during the process of searching for the corresponding bit code, while further reducing the time complexity of the linear search. In other words, the MRSA algorithm continuously tracks the number of available enabled or turned on voltage conversion units only through the shifting and incrementing processes without resetting, so the issue of overshooting can be effectively prevented. The equivalent output impedance value may be adaptively and dynamically adjusted or switched according to the circuit configuration of the voltage conversion unit to suppress the conversion loss caused by the impedance change, while preventing additional quiescent current and leakage current consumption. In the physical layout design, a high-density chip composed of a gate stack junction structure of the tightly coupled first metal layer M1 and polysilicon region generates the additional inductive capacitor between the gate overlapping with the flying capacitor and the flying capacitor, which can increase the capacitance density and the capacitance density gain in the limited layout space of the element. In addition, the voltage conversion controller can adaptively adjust the frequency based on the feedback value of the output voltage to adjust the switching frequency of the voltage conversion unit and suppress the power loss related to the switching frequency, thereby implementing a relatively wide load range.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An adjustable voltage regulator circuit, comprising:
   a voltage conversion circuit, receiving an input voltage to generate an output voltage in a first clock cycle;
   a voltage conversion controller, detecting the output voltage, comparing the output voltage with at least one reference voltage value, and outputting an enable signal based on a comparison result to control the voltage conversion circuit to adjust the output voltage; and
   a clock generator, generating at least one first clock signal and at least one second clock signal to respectively drive the voltage conversion circuit and the voltage conversion controller,
   wherein the voltage conversion controller adjusts the enable signal to gradually restore the output voltage to a predetermined voltage range, wherein the voltage conversion controller gradually adjusts the output voltage based on a feedback voltage generated by the voltage conversion circuit in a second clock cycle, wherein the voltage conversion controller continuously detects the output voltage and the feedback voltage of the voltage conversion circuit from the first clock cycle to the second clock cycle, and adjusts a switching frequency of the voltage conversion circuit based on the feedback voltage of the voltage conversion circuit, wherein the voltage conversion controller controls the enable signal to adjust the switching frequency of the voltage conversion circuit based on a gradual adjustment algorithm, wherein the voltage conversion controller determines a plurality of reference voltage values based on a gradual shift algorithm, and the reference voltage values comprise:

a first reference voltage value;

a second reference voltage value, wherein the predetermined voltage range is between the first reference voltage value and the second reference voltage value; and a third reference voltage value, wherein a region between the second reference voltage value and the third reference voltage value is a first search region, a region lower than the third reference voltage value is a second search region, and a region higher than the first reference voltage value is a third search region, wherein a search rate used by the voltage conversion controller in the first search region is different from a search rate used in the second search region.

2. The adjustable voltage regulator circuit according to claim 1, wherein the voltage conversion controller comprises:

a plurality of comparators, wherein each of the comparators receives the output voltage and a corresponding reference voltage for comparison, and outputs a comparison value;

a shift register, receiving the comparison value and a direction signal, and judging using the gradual adjustment algorithm based on the comparison value, wherein when the output voltage is less than the reference voltage, at least one of a fast search mode and a normal search mode is executed to search for and output a bit code of a corresponding voltage as the enable signal; and a frequency controller, receiving the second clock signal and the direction signal, and outputting a frequency selection signal to adjust an output frequency of at least one of the first clock signal and the second clock signal of the clock generator.

3. The adjustable voltage regulator circuit according to claim 2, wherein the frequency controller judges that when the output voltage is in a predetermined range and the bit code exceeds a predetermined threshold, an output frequency of the clock generator is adjusted, and the bit code is reset to a predetermined value.

4. The adjustable voltage regulator circuit according to claim 2, wherein the bit code executes bit shift left, bit shift right, and bit increment based on the gradual adjustment algorithm to adjust a search rate of the voltage conversion controller.

5. The adjustable voltage regulator circuit according to claim 4, wherein a search rate used by the voltage conversion controller in a first search region is less than a search rate used in a second search region.

6. The adjustable voltage regulator circuit according to claim 4, wherein the voltage conversion controller has a same adjustment frequency in a second search region and a third search region.

7. The adjustable voltage regulator circuit according to claim 4, wherein a search rate used by the voltage conversion controller in a first search region is different from a search rate used in a third search region.

8. The adjustable voltage regulator circuit according to claim 1, wherein the voltage conversion controller controls the voltage conversion circuit to generate a corresponding output impedance value, and adjusts the output voltage based on the corresponding output impedance value.

9. The adjustable voltage regulator circuit according to claim 1, wherein the voltage conversion circuit comprises:

a plurality of voltage conversion units, receiving the first clock signal to execute voltage conversion, wherein each of the voltage conversion units has a corresponding weight; and a logic controller, receiving the enable signal generated by the voltage conversion controller based on the feedback voltage, generating a corresponding control code based on the enable signal, and determining whether the voltage conversion units are turned on based on the control code, wherein one of the voltage conversion units is in a constant turned-on state.

10. The adjustable voltage regulator circuit according to claim 9, wherein the control code is used to determine a number of turned-on voltage conversion units, and the control code has at least a same number of bits as a number of the voltage conversion units.

11. The adjustable voltage regulator circuit according to claim 9, wherein each of the voltage conversion units is a symmetric bias circuit composed of a plurality of transistors, wherein each of the symmetric bias circuits in the voltage conversion units receives the same input voltage, and an output terminal of the each of the symmetric bias circuits is connected to each other.

12. The adjustable voltage regulator circuit according to claim 11, wherein the symmetric bias circuit comprises:

a first transistor, receiving the input voltage and a second gating clock signal generated by the clock generator;

a second transistor, receiving the input voltage and a first gating clock signal generated by the clock generator, wherein a second drain terminal of the second transistor is connected to a first base terminal of the first transistor, and a second base terminal of the second transistor is connected to a first drain terminal of the first transistor, wherein the first base terminal and the second base terminal receive the input voltage as a bias voltage;

a third transistor, receiving the first gating clock signal, wherein a third base terminal and a third drain terminal of the third transistor are connected to each other; and a fourth transistor, receiving the second gating clock signal, wherein a fourth base terminal and a fourth drain terminal of the fourth transistor are connected to each other, and the fourth drain terminal of the fourth transistor is connected to the third drain terminal of the third transistor, wherein the fourth drain terminal of the fourth transistor and the third drain terminal of the third transistor are the output terminal of the symmetric circuit, and the output voltage is output by the output terminal.

13. The adjustable voltage regulator circuit according to claim 12, wherein the symmetric bias circuit further comprises:

a first capacitor, wherein one terminal of the first capacitor is connected to a first source terminal of the first transistor and the second base terminal of the second transistor, and other terminal is connected to a third drain terminal of the third transistor; and a second capacitor, wherein one terminal of the second capacitor is connected to a second source terminal of the second transistor and the first base terminal of the first transistor, and other terminal is connected to a fourth drain terminal of the fourth transistor, wherein the first capacitor and the second capacitor are connected in parallel.

14. The adjustable voltage regulator circuit according to claim 12, wherein at least one of the first capacitor and the second capacitor of the symmetric bias circuit forms an additional third capacitor between a first metal layer and a gate of at least one of the first capacitor and the second capacitor when configuring a physical design layout.

15. The adjustable voltage regulator circuit according to claim 12, wherein when the symmetric bias circuit is during a first time interval, the first transistor is turned off, and the second transistor has an additional forward bias, wherein when the symmetric bias circuit is during a second time interval, the second transistor is turned off, and the first transistor has an additional forward bias, and the first time interval and the second time interval are successively and alternately switched in an operation cycle.

* * * * *